(12) United States Patent  (10) Patent No.: US 8,267,062 B2
Chipperfield  (45) Date of Patent: Sep. 18, 2012

(54) INTERNAL COMBUSTION ENGINE

(75) Inventor: Richard F. Chipperfield, Charlestown, RI (US)

(73) Assignee: Rich Ideas Created-Holding Company, Inc., Charlestown, RI (US)

( * ) Notice: Subject to any disclaimer, the term of this patent is extended or adjusted under 35 U.S.C. 154(b) by 0 days.

(21) Appl. No.: 11/702,033

(22) Filed: Feb. 1, 2007

(65) Prior Publication Data

US 2007/0193553 A1  Aug. 23, 2007

Related U.S. Application Data

(60) Provisional application No. 60/764,429, filed on Feb. 1, 2006.

(51) Int. Cl.
*F16J 9/20* (2006.01)
(52) U.S. Cl. .................................. 123/193.6
(58) Field of Classification Search ............. 123/193.6, 123/668; 277/448, 454, 468, 472, 474
See application file for complete search history.

(56) References Cited

U.S. PATENT DOCUMENTS

| | | | | | |
|---|---|---|---|---|---|
| 1,582,792 | A | * | 4/1926 | Schultz | 123/276 |
| 3,268,235 | A | * | 8/1966 | Jacobellis | 277/468 |
| 3,656,766 | A | * | 4/1972 | Geffroy | 277/451 |
| 3,814,445 | A | * | 6/1974 | Bitzan | 277/589 |
| 3,885,800 | A | * | 5/1975 | Sievenpiper | 277/468 |
| 3,921,988 | A | * | 11/1975 | Prasse et al. | 277/451 |
| 4,102,608 | A | * | 7/1978 | Balkau et al. | 417/242 |
| 4,142,500 | A | * | 3/1979 | Davis | 123/193.6 |
| 4,190,259 | A | * | 2/1980 | Zitting | 277/584 |
| 4,440,069 | A | * | 4/1984 | Holtzberg et al. | 92/224 |
| 4,577,611 | A | * | 3/1986 | Hagino | 123/669 |
| 4,646,707 | A | * | 3/1987 | Pfefferle | 123/668 |
| 5,133,564 | A | * | 7/1992 | Chang | 277/446 |
| 5,275,422 | A | * | 1/1994 | Rehfeld | 277/468 |
| 5,901,678 | A | * | 5/1999 | Bielaga | 123/193.6 |
| 6,065,438 | A | * | 5/2000 | Kiesel | 123/193.6 |
| 6,199,868 | B1 | * | 3/2001 | Evans | 277/468 |
| 6,502,826 | B1 | * | 1/2003 | Schroeder et al. | 277/468 |
| 2004/0083729 | A1 | * | 5/2004 | Teacherson | 60/517 |
| 2008/0134879 | A1 | * | 6/2008 | Hofbauer | 92/186 |

* cited by examiner

*Primary Examiner* — M. McMahon
(74) *Attorney, Agent, or Firm* — Tejpal S. Hansra

(57) ABSTRACT

In an engine, blow-by is substantially eliminated and friction is significantly reduced using one or more combinations of non-metallic rings. By substantially eliminating blow-by and by reducing friction, certain engine parameters may be changed. In addition, by substantially eliminating blow-by and by reducing friction, pollution may be reduced, fuel economy may be increased and power may be increased.

15 Claims, 6 Drawing Sheets

INTERNAL COMBUSTION ENGINE

CROSS-REFERENCE TO RELATED APPLICATION

This application claims the benefit of U.S. Provisional Application No. 60/764,429, filed Feb. 1, 2006, entitled "Engine," which is incorporated herein by reference.

FIELD OF THE INVENTION

The present invention relates generally to engines including, for example, internal combustion engines used in automobiles.

BACKGROUND OF THE INVENTION

Environmental pollution is one of the most-discussed issues in the world today. Pollution and greenhouse gases have been blamed for causing climate change, health problems and natural disasters, such as hurricanes and flooding.

Two of the largest causes of environmental pollution and greenhouse gases are the automotive industry and the power industry, both of which burn fossil fuels in internal combustion engines. Engines for cars, trucks, airplanes, trains, ships, boats, buses, motorcycles, mopeds, snowmobiles, chainsaws and lawnmowers (among others) spew pollution and greenhouse gases into the environment. Power plants use engines that burn fossil fuels such as natural gas, diesel and coal, which produce additional pollution and greenhouse gases.

The concerns relating to pollution and greenhouse gases are expected to increase as emerging countries, such as China and India, continue their economic development. The total number of internal combustion engines that burn fossil fuels is only expected to increase. The manner in which pollution and greenhouse gases is regulated, generally, varies from country-to-country. The degree of enforcement of such regulations also, generally, varies from country-to-country. However, there are no strict boundaries associated with the spreading of pollution and greenhouse gases. Accordingly, at present, there is no practical solution to solve this global problem.

Alternative fuels, such as hydrogen and ethanol, have been proposed to reduce pollution and/or greenhouse gases. Automobiles powered by hydrogen-based fuel cell technology are expected to be completely pollution free. However, with respect to hydrogen, the infrastructure for a so-called hydrogen-based economy is not yet available. For example, hydrogen-based filling stations are not widely-available. Furthermore, there is no low-cost method for producing and storing hydrogen in large volumes.

If automobile engines used only ethanol as their fuel, pollution would be reduced, since ethanol is a clean-burning fuel. However, carbon dioxide, which is a greenhouse gas, would still be produced. Depending upon the design of an ethanol-burning engine (e.g., the compression ratio and, correspondingly, the temperature inside the engine), other greenhouse gases (e.g., oxides of nitrogen) might still be produced.

Furthermore, techniques are not available to supply enough ethanol to sustain an ethanol-based fuel economy. In fact, there is an insufficient capacity to produce ethanol to supply the world with a mixture of more than 10% of ethanol with other engine fuels.

Efforts have been made to reduce pollution caused by internal combustion engines that use fossil fuels. For example, catalytic converters have been used in combination with internal combustion engines in an attempt to burn-away hydrocarbons that remain unburned in the internal combustion engine. To explain certain problems associated with engines that use catalytic converters, reference is made to FIG. 1.

FIG. 1 is a simplified block diagram of a system 100 that includes an internal combustion engine 110, an air supply 120, a fuel supply 130, a carburetor/fuel injector 140, a drive shaft 150, a catalytic converter 160, an air blower 170 and a PCV valve 180. Ambient air is drawn from the environment through the air supply 120 and is mixed with fuel supplied by the fuel supply 130. The air-fuel mixture is then delivered to the internal combustion engine 110 via a carburetor or fuel injector 140.

Through well-known techniques, a combustion process occurs, whereby chemical energy is converted over a number of steps to mechanical energy that is used to turn the drive shaft (e.g., chemical energy to heat energy, heat energy into kinetic energy, and kinetic energy to mechanical energy and, in the case of power plants, mechanical energy to electrical energy). Because of incomplete combustion, unburned hydrocarbons and carbon monoxide are present in the engine 110. Instead of expelling these pollutants into the environment, the unburned hydrocarbons and carbon monoxide are delivered to a catalytic converter 160 (in some cases, multiple catalytic converters), so a large portion of such unburned hydrocarbons and carbon monoxide are burned before exhausting the remainder into the environment.

In order to burn such unburned hydrocarbons, an air blower 170 is used to introduce ambient air, which has not been subjected to the combustion process in the internal combustion engine. The ambient air includes two major gases, nitrogen and oxygen. The oxygen from the ambient air is used as a catalyst to burn the unburned hydrocarbons. However, because (in part) of the inhibiting affects of nitrogen (which is itself a fire retardant, often used in fire extinguishers), platinum is used in the catalytic converter as a catalyst for oxygen. Platinum increases the catalytic affect of oxygen to increase the temperature in the catalytic converter 160 to sufficient levels to complete the burning of most unburned hydrocarbons and carbon monoxide.

A significant problem with raising the temperature to such levels (e.g., above about 1850 degrees Fahrenheit) is that compounds of oxygen unite with various compounds of nitrogen to form various oxides of nitrogen, collectively known as NOx. NOx is thought to include greenhouse gases, which are believed to contribute to global warming. In fact, some believe that NOx is three hundred times more potent a greenhouse gas than carbon dioxide.

The inventor has recognized that NOx could be significantly reduced if a technique were available to reduce or eliminate the nitrogen being introduced into the catalytic converter 160 by the air blower 170. The inventor has also recognized that the amount of unburned hydrocarbons could be significantly reduced if a technique were available to reduce or eliminate the nitrogen being introduced into the internal combustion chamber of the internal combustion engine 110.

As can be seen from FIG. 1, the unburned hydrocarbons exiting the internal combustion engine 110 represent chemical energy that has been unconverted into heat energy. Once the unburned hydrocarbons are delivered to the catalytic converter, they are converted into heat energy. However, such heat energy is not converted into kinetic energy and, therefore, cannot be converted into mechanical energy (or, ultimately, electric energy in the case of a power plant). In other words, no useful work is performed by the unburned hydrocarbons with respect to powering the drive shaft 150. The inventor has recognized that the amount of useful work associated with powering the drive shaft 150 can be increased if a technique were available to more completely burn a higher percentage of the fuel in the combustion chamber of the internal combustion engine 110, so that significantly less unburned hydrocarbons were expelled from the combustion chamber of the internal combustion engine 110.

Referring still to FIG. 1, unused heat energy is also delivered from the combustion chamber of the internal combustion engine 110 to the catalytic converter 160—the greater the percentage of unburned hydrocarbons, the greater the percentage of waste heat (i.e., heat that is not converted into mechanical energy). The inventor has recognized that the amount of useful work associated with powering the drive shaft 150 can be increased if a technique were available to more completely burn a higher percentage of the fuel in the combustion chamber of the internal combustion engine 110, thereby reducing the amount of waste heat expelled from the combustion chamber of the internal combustion engine 110.

In addition, waste heat is absorbed by the internal components of the combustion chamber (e.g., the heads, the pistons, the exhaust valve, the intake valve, the cylinder walls, etc.) of the internal combustion engine. The inventor has recognized that the amount of useful work associated with powering the drive shaft 150 can be increased if a technique were available to recover the potential energy associated with the waste heat absorbed by the internal components of the combustion chamber of the internal combustion engine 110.

FIG. 2 is a simplified and enlarged cross-sectional view of a portion of a conventional internal combustion engine 200 illustrating an engine block 210, a cylinder 212, a head assembly 214, a combustion chamber 216, a piston 218 (including a head portion 220 and a skirt 222), a rod 224, a wrist pin 226, a first metallic compression ring 230, a second metallic compression ring 238, a metallic oil ring 239, an intake manifold 242, an exhaust manifold 244, an intake valve 246, an exhaust valve 248 and a spark plug 250. FIG. 3 is a cross-sectional view taken along line 3-3 of FIG. 2, which illustrates a cross-section of the piston 218, wrist pin 226 and rod 224. FIG. 4 is a magnified view of a portion of FIG. 3, which illustrates the first metallic compression ring 230 and the second metallic compression ring 238, without showing its metallic oil ring 239. FIG. 5 is a diagrammatic representation of piston positions inside a cylinder of a conventional four-stroke engine and associated valve positions.

The operation of internal combustion engine 200 is well-known and, therefore, will only be briefly described. With reference to FIGS. 2-5, the piston 218 starts at top dead center. Top dead center is the position of the piston shown in FIG. 2, without regard to the opening or closing of the intake valve 246 or the exhaust valve 248.

The suction stroke begins when the piston 218 moves downwardly as a cam (not shown) simultaneously opens the intake valve 246 (with the exhaust valve 248 closed), so that the air/fuel mixture is drawn into the cylinder 212 by the suction created by movement of the piston 218 (see FIG. 5). Once the piston 218 reaches bottom dead center, the intake valve 246 is closed and the exhaust valve 248 remains closed, thereby ending the suction stroke and beginning the compression stroke.

During the compression stroke, the piston 218 moves upwardly, thereby compressing the air/fuel mixture. The compression stroke ends and the power stroke begins when the piston 218 reaches top dead center, again with both the intake valve 246 and the exhaust valve 248 closed.

During the power stroke, the spark plug 250 fires, which ignites the fuel and creates the energy sufficient to thrust the piston 218 downward. The power stroke ends and the exhaust stroke begins when the piston 218 reaches bottom dead center.

During the exhaust stroke, a cam (not shown) is used to open the exhaust valve 248, when the piston 218 is at bottom dead center. As the piston 218 moves upwardly, products of combustion are pushed out of the cylinder (past the exhaust valve 248) and into the exhaust manifold 244. Ultimately, after the piston has reached top dead center (i.e., the end of the exhaust stroke), most of the products of combustion are delivered to a catalytic converter 160 (see FIG. 1), where a second combustion takes place, during which attempts are made to burn the unburned hydrocarbons.

The exhaust stroke ends when the piston 218 is at top dead center and the exhaust valve 248 is closed and the intake valve 246 is simultaneously opened. The 4-cycle process is complete and the process begins again with the next suction stroke.

As seen in FIG. 4, the first metallic compression ring 230 is located in first annular groove 228 in the piston 218 and the second metallic compression ring 238 is located in second annular groove 236 in the piston 218. The first and second metallic compression rings 230, 238 each extend beyond the outer diameter of the piston and are designed to contact the cylinder wall 212 (see FIG. 2).

Because of temperature changes in cylinder 212, the first and second metallic rings 230, 238 are made of spring steel that is designed to expand and contract. The first and second metallic rings 230, 238 each include a gap 252, as shown in FIG. 6. The gap 252 closes as the temperature inside the cylinder 212 increases. Conversely, the gap 252 opens as the temperature inside the cylinder 212 decreases. More specifically, when the piston 218 is heated and expands, the first and second metallic rings 230, 238 are forced against the cylinder wall 212, which squeezes the spring steel, thereby reducing the size of the gap 252.

The first and second metallic rings 230, 238 each have a height 254, 256 (respectively). Because the height of the first metallic ring 230 expands due to the heat in the cylinder 212, the first metallic ring 230 is not tightly seated in the first annular groove 228. (Likewise, the second metallic ring 238 is not tightly seated in the second annular groove 236.) Accordingly, some tolerance (not shown) is provided between the height of the first annular groove 228 and the height of the first metallic ring 230. If sufficient tolerance were not provided, the friction between the upper/lower surfaces of the first metallic ring 230 and the corresponding surfaces of the first annular groove 228 would prevent the gap 252 of the first metallic ring 230 from closing at higher temperatures. Therefore, the friction between the metallic ring 230 and the cylinder wall 212 would increase, causing the engine to cease (not unlike what would occur if the engine lost its engine coolant or engine oil).

The tolerance between the first metallic ring 230 and the first annular groove 228 (and, likewise, the tolerance between the second metallic ring 238 and the second annular groove 236) allows for blow-by, which causes a number of problems each of which damage the engine. For example, during the suction stroke, blow-by of the air/fuel mixture through the gap between the piston 218 and the cylinder wall 212 into the crankcase (not shown, but below the piston 218) both reduces the volumetric efficiency of the engine (thereby reducing fuel economy) and gives rise to the need of a PCV valve 180 (see FIG. 1) to extract oil and fuel vapors from the crankcase.

During the compression stroke, hydrocarbons (such as oil vapors and fuel vapors) are drawn up from the crankcase into the combustion chamber after blowing-by the first metallic compression ring and the second metallic compression ring 230, 238. The oil in the crankcase is designed to lubricate the cylinder wall 212, while resisting combustion. Accordingly, oil vapors similarly are designed to resist combustion, whereas fuel vapors are designed to burn. Unfortunately, the oil vapors are mixed with the air/fuel mixture that is being prepared for combustion during the compression stroke. Some of the oil vapors become attached to the internal components of the combustion chamber (e.g., the piston head 220, bottom of the intake valve 246, the bottom of the exhaust valve 248, the spark plug 250, etc.). In addition, some of the oil vapors become affixed to the first and second compression rings 230, 238.

During the power stroke, the oil vapors that are mixed with the air/fuel mixture result in incomplete combustion. Specifically, the portion of the air/fuel mixture that does not burn leads to the production of unburned hydrocarbons, among other things. Similarly, the portion of the oil vapors that does not burn also leads to the production of unburned hydrocarbons, among other things. Because the oil vapors are not designed to burn, they interfere with the efficient movement of the flame front, which leads to further incomplete combustion of the air/fuel mixture causing even more unburned hydrocarbons and a reduction in kinetic energy.

Still during the power stroke, some unburned hydrocarbons and unburned air/fuel mixture are blown-by the rings into the crankcase causing additional oil vapors, while other unburned hydrocarbons become attached to the first and second metallic rings 230, 238 before they can reach the crankcase. Because the temperature of the unburned hydrocarbons and the air/fuel mixture is high relative to the temperature during the suction stroke, the amount of oil vapors that is produced during the power stroke is generally greater than the amount of oil vapors produced during the suction stroke. This gives rise to a greater need for a PCV valve 180. It should also be noted that unburned hydrocarbons can also become attached to the piston head 220 and the cylinder walls 212 during the power stroke.

During the exhaust stroke, oil vapors and fuel vapors are drawn up from the crankcase by the rising piston 218. Some of the oil vapors attach themselves to the first and second metallic compression rings 230, 238 and to the first and second annular grooves 228, 236. Other oil vapors blow-by the rings on their way into the combustion chamber 216 and, along with unburned hydrocarbons (i.e., those hydrocarbons that have been exposed to the combustion process), become attached to the internal components of the engine including the cylinder wall 212, the piston head 220, bottom of the intake valve 246, the bottom of the exhaust valve 248, the bottom of the head assembly 214, the spark plug 250, the valve seat of the exhaust valve and the exhaust manifold 244 (and, if present, fuel injectors). Because the oil vapors and unburned hydrocarbons are not evenly distributed on the seat of the exhaust valve, the exhaust valve 248 may leak.

As a result of the oil vapors and unburned hydrocarbons sticking to the internal components of the engine, along with heat radiating from the exhaust valve 248, problems may be caused such as pre-ignition, dieseling, knock, ping, and shockwaves, resulting in additional blow-by and damage to the engine. Ultimately, this results in reduced fuel economy, reduced power, increased pollution, increased engine wear and the need for increased maintenance.

Blow-by also causes other problems in the engine. Because the chemistry of the unburned hydrocarbons is equal to sand and glass in its abrasiveness, when the unburned hydrocarbons mix with the oil in the crank case, the viscosity of the oil is broken down. Instead of the oil lubricating moving parts of the engine, the oil becomes a medium for transporting the unburned hydrocarbons to the moving parts, thereby creating excessive wear of such moving parts.

The unburned hydrocarbons in the oil and the unburned hydrocarbons on the cylinder wall 212 may also plug-up the orifices of the oil ring 239 (see FIG. 3), thereby rendering the oil ring 239 inoperable. Therefore, the oil ring 239 is unable to deliver a sufficient amount of oil through at least some of its orifices to locations along the cylinder wall 212. At such locations, the metal-to-metal contact between the skirt 222 of the piston 218 may cause scoring of the cylinder wall 212 or cause wear of the skirt 222 of the piston 218 (resulting, for example, in piston slap). Furthermore, the metal-to-metal contact between the first and second metallic compression rings 230, 238 and the cylinder wall 212 at such locations may cause wearing of the first and second metallic compression rings 230, 238, scoring of the cylinder wall 212 or ceasing of the engine. The scoring of the cylinder wall 212, the wearing of the skirt 222 of the piston 218 and the wearing of the first and second metallic compression rings 230, 238, all result in further blow-by.

Furthermore, the unburned hydrocarbons that are attached to the first and second metallic compression rings 230, 238 and that are lodged in the first and second annular grooves 228, 236, reduce the effectiveness of the first and second metallic compression rings 230, 238 (e.g., requiring a ring job), since they cannot open and close their gaps 252 properly. Therefore, the first and second metallic compression rings 230, 238 may break, wear, or cause scoring of the cylinder wall 212. Accordingly, blow-by is increased, thereby further exacerbating the problem and accelerating the demise of the engine.

The inventor of the present invention has recognized that fuel efficiency will be increased, power will be increased, pollution will be reduced, engine life will be lengthened, maintenance costs will be reduced, and superfluous parts can be eliminated (e.g., catalytic converter 160, air blower 170, PCV valve 180 and the sensors and computing power associated with the regulation of such items, thereby reducing the cost and the weight of the engine and saving space), if a technique were available to reduce or eliminate blow-by.

Because engines similar to the one shown in FIGS. 2-6 use first and second metallic compression rings which engage the cylinder wall, the design of such engines is limited due to the contact area between the metal rings and the cylinder wall. For example, friction is exponentially increased as the diameter of the cylinder is increased, since the contact area between the metal rings and the cylinder wall is exponentially increased. Also, the likelihood and amount of blow-by will increase (as will the likelihood of the problems associated with blow-by, discussed above), since the area in which blow-by may occur is also exponentially increased when the diameter of the cylinder is increased. Furthermore, as the length of the stroke of the piston inside the cylinder is increased, the friction between the metal rings and the cylinder wall will exponentially increase, since the contact area between the metal rings and cylinder wall exponentially increases.

In order to reduce the friction and blow-by in each individual cylinder, cylinder sizes and stroke lengths are designed to be relatively small. However, in order to increase the amount of power associated with each individual cylinder, the average velocity of the piston (per stroke) inside of the cylinder must be correspondingly increased. As a consequence of increasing the average velocity of the piston, the amount of friction per unit time increases and the temperature increases (giving rise to possibility of the formation of oxides of nitrogen, which forces the engine designer to reduce the compression ratio by engine redesign).

Furthermore, in order to provide sufficient power for the engine as a whole, a larger number of cylinders is required, thereby increasing the number of component parts, increasing the space required for such parts, increasing the weight (which reduces fuel economy), increasing the maintenance and increasing the cost. Even further, the increased number of cylinders increases the collective amount of friction, the collective amount of heat loss and the collective amount of blow-by (and their associated problems, discussed above).

The inventor of the present invention has recognized that it would be beneficial to provide an engine that maintained or increased the amount of power per cylinder while decreasing the average velocity of the piston (per stroke) inside of the cylinder, so that the total number of cylinders could be reduced, the number of component parts could be reduced, the collective space required could be reduced, the weight could be reduced, the fuel economy could be increased, the collective amount of maintenance could be reduced, the relative cost could be reduced, the collective amount of friction could be reduced, the collective amount of heat loss could be reduced, the collective amount of blow-by (and its associated problems, discussed above) could be reduced and the collective amount of pollution could be reduced.

In the 1970's and 1980's, in an effort to reduce blow-by, the inventor of the present invention researched, developed and tested an internal combustion engine. More specifically, the inventor modified an existing Chevrolet V-8 engine and incorporated his technology. Although features of the inventor's modified engine are described below, the inventor does not necessarily admit that such engine is "prior art," as such term is legally defined.

The inventor's modified engine differed from the internal combustion engine discussed in FIGS. 2-6. Specifically, instead of having a second metallic compression ring 238 of FIGS. 2-4, a non-metallic ring assembly 738 (shown in FIG. 7) was used. Neither the first metallic compression ring 230, nor the oil ring 239 was replaced. In addition, the cylinder was slightly bored-out (approximately 0.060 inch) and had a smooth, mirror-like finish.

FIG. 7 is a simplified, enlarged and exaggerated diagrammatic representation of a portion of a cylinder wall 712, a portion of a piston 218, a gap 232 between the cylinder wall 712 and the piston 218, an annular groove 736 and a non-metallic ring assembly 738. The non-metallic ring assembly 738 includes a generally T-shaped (in cross-section) Rulon ring 740 and a Viton O-Ring 742.

The Rulon ring 740 has a front 744, which contacts the cylinder wall 712 as the bearing area, and a back 746 which is that surface furthest from the cylinder wall 712. The height of the back 746 of the Rulon ring 740 is approximately twice the height of the front 744 of the Rulon ring 740.

The Viton O-Ring 742 operates as a spring against the Rulon ring 740 and pre-loads the Rulon ring 740 against the cylinder wall 712. The Viton O-Ring 742 sits in the area between the back 746 of the Rulon ring 740 and the back 748 of the annular groove 736. When heated and under pressure, the Viton O-Ring 742 acts hydrostatically.

A system pressure (either positive or negative, depending on the stroke of the engine) is created in the gap 232 between the cylinder wall 712 and the piston 218. The bearing pressure associated with the pre-load is sufficient to direct the system pressure between the back 746 of the Rulon ring 740 and the back 748 of the annular groove 736, taking the path of least resistance.

The Viton O-Ring 742, acting hydrostatically, moves to the top or bottom of the Rulon ring (depending on whether the system pressure is positive or negative) and operates as a check valve to prevent the system pressure from flowing thereby. Thus, the Viton O-Ring 742 prevents any blow-by behind the non-metallic ring assembly 738 (through the annular groove 736) into the crankcase or the combustion chamber 216, depending upon whether the system pressure is positive or negative.

The moments of force associated with the system pressure are directed (perpendicularly) from the back 746 of the Rulon ring 740 toward the front 744 of the Rulon ring 740. Since the back 746 of the Rulon ring 740 is approximately twice the height of the front 744 of the Rulon ring 740, the force against the cylinder wall 712 is amplified and is approximately twice the force of the system pressure, which prevents any blow-by between the Rulon ring 740 and the cylinder wall 712. In view of the above, it can be seen that the non-metallic ring assembly 738 prevents blow-by, either at the bearing area or at the back the non-metallic ring assembly, regardless of whether the system pressure is from the combustion chamber 216 towards the crankcase or from the crankcase towards the combustion chamber 216, completing a universal seal.

The force in the bearing area is dependent upon the system pressure, since the system pressure is directed behind the Rulon ring 740. Accordingly, the force in the bearing area will change depending upon the system pressure. Thus, the greater the system pressure, the higher the bearing pressure (and visa-versa). Therefore, the non-metallic ring assembly 738 forms a dynamic seal.

One of the problems with the non-metallic ring assembly 738 shown in FIG. 7 is that oil vapors (from the oil on the cylinder walls 712 and the oil from the crankcase) and unburned hydrocarbons (from the fossil fuels) find their way to the back 746 of the Rulon ring 740. This can cause the Viton O-Ring 742 to become dirty and can cause the Viton O-Ring 742 to lose its ability to perform as a check valve. Furthermore, the Viton O-Ring 742 can lose its elastic spring-like qualities, thus not providing an adequate pre-load. Accordingly, over time, the non-metallic ring assembly may allow blow-by both near the front 744 of the Rulon ring 740 (i.e., the front of the non-metallic ring assembly 738) and near the Viton O-Ring 742 (i.e., the back of the non-metallic ring assembly 738).

In addition to the changes described above, the inventor's modified engine also used a larger flywheel (not shown) that the flywheel used in the unmodified Chevrolet V-8 engine. Furthermore, the flywheel had a greater amount of weight concentrated near its periphery than the flywheel of the unmodified Chevrolet V-8 engine.

The inventor's modified engine was subjected to an emissions test and the modified engine passed such test. However, more impressively, the inventor's modified engine passed the emissions test without a catalytic converter or an air blower.

On Jan. 4, 2005, the inventor of the present invention was awarded U.S. Pat. No. 6,837,205, which is entitled "Internal Combustion Engine" and which was filed on Oct. 28, 2002. U.S. Pat. No. 6,837,205 is incorporated herein by reference.

In an effort to reduce the potential for blow-by described in connection with the non-metallic ring assembly of FIG. 7, U.S. Pat. No. 6,837,205 discloses a first compression ring assembly 800 (although the aforementioned term is not used in the patent) and a non-metallic compression ring 838. No change was made to the oil ring.

As shown in FIG. 8, the first compression ring assembly 800 is received in first annular groove 828 of piston 818 and includes first and second outer metallic rings 830, 832, with gaps (like gap 252 in FIG. 6) that are oriented 180 degrees apart to reduce blow-by through the gaps. In addition, the first compression ring assembly 800 includes a non-metallic O-ring 834, which positively urges the first and second outer metallic rings 830, 832 into contact with the cylinder wall 812. The O-ring 834 also operates as a check valve in an effort to reduce blow-by.

The non-metallic compression ring 838 is non-gapped, so as to provide for the preloading thereof, and essentially prevents any blow-by. The height of non-metallic compression ring 838 is the same as the height of the annular groove 836 in which it is seated, so as to prevent any foreign materials from getting between the non-metallic compression ring 838 and the annular groove 836.

There can be problems associated with both the first compression ring assembly 800 and the non-metallic compression ring 838 shown in FIG. 8. For example, one of the problems with the first compression ring assembly 800 is that there is metal-to-metal contact between the outer metallic rings 830, 832 and the cylinder wall 812. This creates friction and heat, and requires oil as a lubricant. Furthermore, friction from the oil ring (not shown in FIG. 8) and the piston skirt (not shown in FIG. 8) exacerbate the problem.

In addition, one of the problems with the non-metallic compression ring 838 is that the inherent characteristics of the non-metallic compression ring 838 are the sole provider of the pre-load of the non-metallic compression ring 838 against the cylinder wall 812. Because of the friction from the metal cylinder walls, the non-metallic compression ring 838 will begin to wear, thereby reducing the pre-load. Once the pre-load has been sufficiently reduced, it becomes difficult to stop blow-by.

Accordingly, there is a need for a revolutionary engine that can solve some or all of the problems described above.

SUMMARY OF THE INVENTION

The present invention is designed to solve at least one or more of the above-mentioned problems.

In an engine, blow-by is substantially eliminated and friction is significantly reduced using one or more combinations of non-metallic rings. By substantially eliminating blow-by and by reducing friction, certain engine parameters may be changed. In addition, by substantially eliminating blow-by and by reducing friction, pollution may be reduced, fuel economy may be increased and power may be increased.

Embodiments of the present invention enhance existing hybrid technologies, such as fuel-electric hybrid technologies. Embodiments of the present invention enable new hybrid (or "tribrid") technologies to be used, such as fuel-steam hybrid technologies or fuel-steam-electric "tribrid" technologies.

Engines described in one or more of the various embodiments can be used in a large number of environments including, for example, cars, trucks, airplanes, power plants, trains, ships, boats, buses, motorcycles, mopeds, snowmobiles, chainsaws and lawnmowers, among others.

Other embodiments, objects, features and advantages of the invention will be apparent from the following specification taken in conjunction with the following drawings.

DETAILED DESCRIPTION OF THE PREFERRED EMBODIMENT

Figure 1:
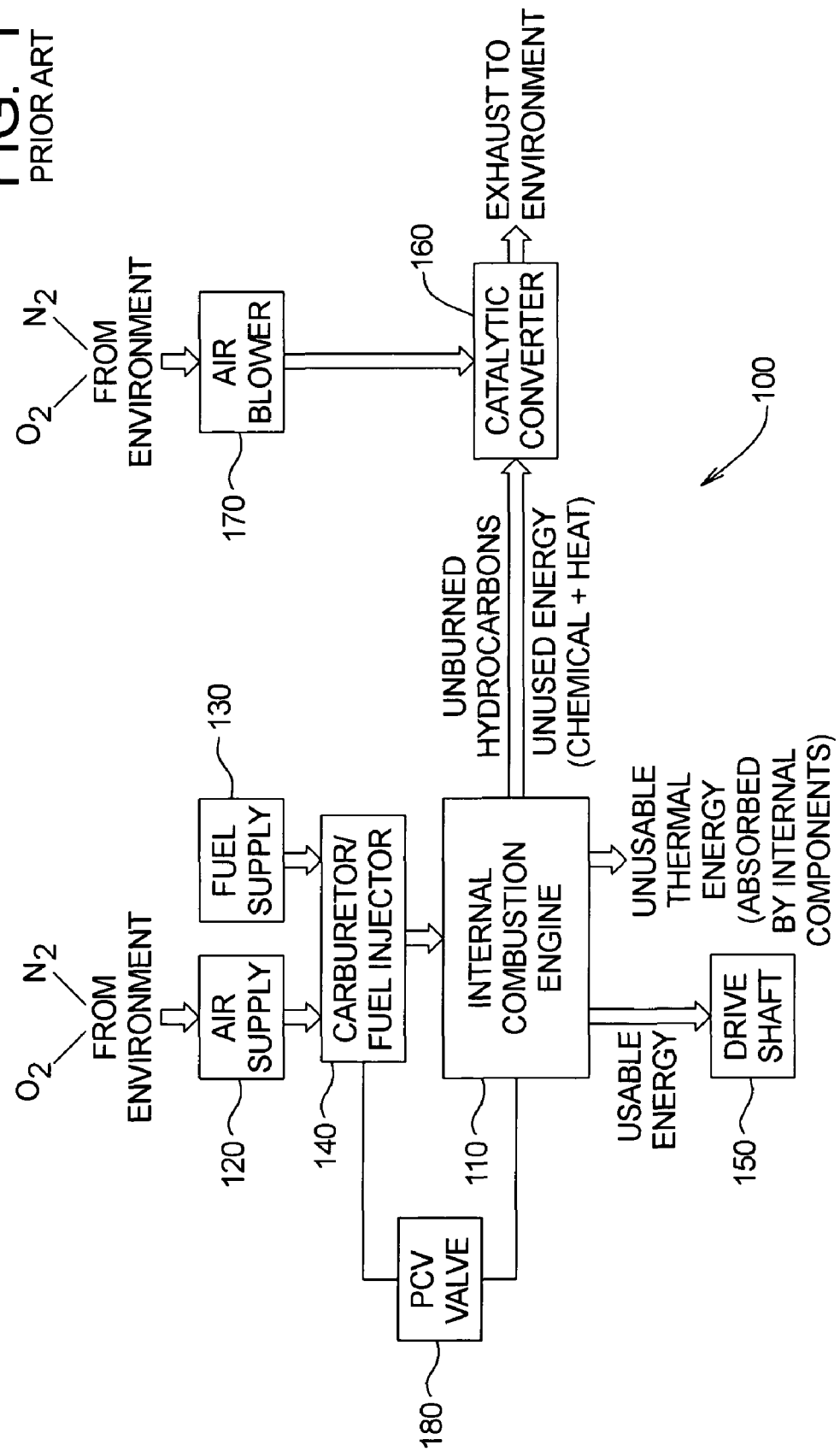
FIG. 1 is a simplified block diagram of a system that includes an internal combustion engine, a catalytic converter and certain associated components.

While this invention is susceptible of embodiments in many different forms, there are shown in the drawings and will herein be described in detail, preferred embodiments of the invention with the understanding that the present disclosure is to be considered as an exemplification of the principles of the invention and is not intended to limit the broad aspects of the invention to the embodiments illustrated.

Figure 9:
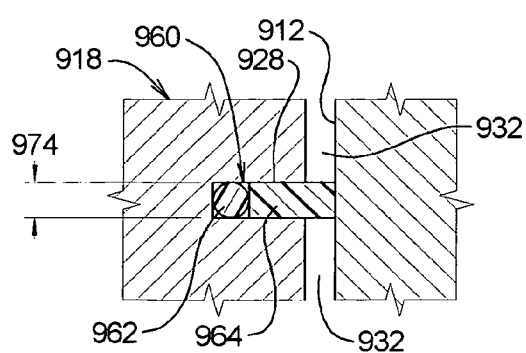
FIG. 9 is an enlarged and exaggerated diagrammatic representation, in cross-section, of a non-metallic ring assembly, a portion of a piston and a portion of a cylinder in accordance with an embodiment of the present invention.

FIG. 9 is an enlarged and exaggerated diagrammatic representation of a portion of a cylinder wall 912, a portion of a piston 918, a ring groove 928, a gap 932 between the cylinder wall 912 and the piston 918, and a non-metallic ring assembly 960. The piston 918 is designed to reciprocate within a cylinder formed by cylinder wall 912.

The non-metallic ring assembly 960 includes a first non-metallic ring 962 and a second non-metallic ring 964 that are received in the ring groove 928. The first non-metallic ring 962 biases the second non-metallic ring 964 towards the cylinder wall 912. The second non-metallic ring 964 contacts the cylinder wall 912 and a static force (as opposed to a dynamic force like that described in connection with FIG. 7) is applied at a bearing area between the second non-metallic ring 964 and the cylinder wall 912 in cooperation with the first non-metallic ring 962.

Figure 7:
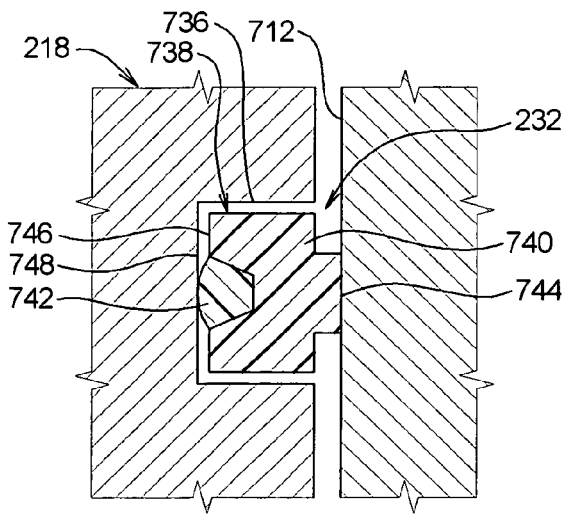
FIG. 7 is an enlarged and exaggerated diagrammatic representation, in cross-section, of a non-metallic ring assembly, along with a portion of a piston and a portion of a cylinder.

That is, in contrast to FIG. 7, the first non-metallic ring 962 and the second non-metallic ring 964 are not designed to purposely allow the system pressure in the gap 932 to be directed behind the second non-metallic ring 964 to change the force between the second non-metallic ring 964 and the cylinder wall 912 depending upon the system pressure. Accordingly, in the embodiment shown in FIG. 9, the force at the bearing area between the second non-metallic ring 964 and the cylinder wall 912 does not increase as the system pressure increases. Therefore, the non-metallic ring assembly 960 forms a static, as opposed to a dynamic, seal in cooperation with the cylinder wall 912.

Figure 10A:
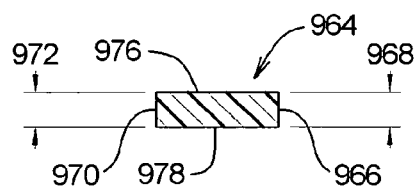
FIG. 10A is an enlarged diagrammatic representation of a cross-section of a second non-metallic ring.

FIG. 10A is an enlarged diagrammatic representation of a cross-section of the second non-metallic ring 964. As shown in FIG. 10A, the second non-metallic ring 964 has a front 966 having a height 968 and has a back 970 having a height 972. In contrast to the Rulon ring 740 shown in FIG. 7, the height 968 of the front 966 of the second non-metallic ring 964 is approximately equal to the height 972 of the back 970 of the second non-metallic ring 964. Furthermore, as shown in FIG. 9, the ring groove 928 has a height 974 that is designed to snugly receive the second non-metallic ring 964, which reduces the likelihood of the first non-metallic ring 962 from becoming dirty (e.g., by being contacted with oil vapors and unburned hydrocarbons).

It should be understood that the ring groove 928 does not necessarily have to have a substantially constant height 974. Accordingly, in one embodiment, if the ring groove 928 did not have a substantially constant height, the second non-metallic ring 964 would have at least one height which would cause at least a portion of the second non-metallic ring 964 to be snugly received by the ring groove 928.

It should be understood that the height 968 of the front 966 of the second non-metallic ring 964 does not have to be substantially equal to the height 972 of the back 970 of the second non-metallic ring 964. In one embodiment, the height 972 of the back 970 of the second non-metallic ring 964 is greater than the height 968 of the front 966 of the second non-metallic ring 964. In another embodiment, the height 972 of the back 970 of the second non-metallic ring 964 is less than the height 968 of the front 966 of the second non-metallic ring 964.

Figure 8:
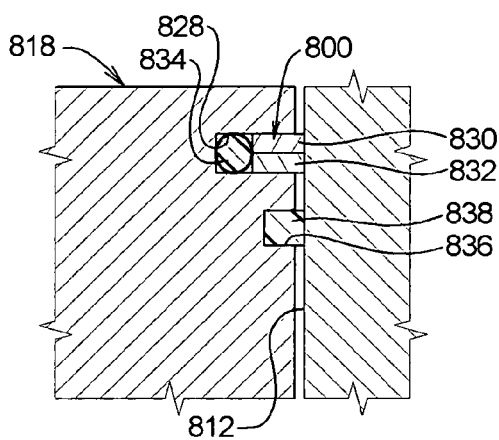
FIG. 8 is a magnified view (somewhat similar to FIG. 4) of a cross-sectional view of a portion of a piston and a portion of a cylinder.

Returning to FIG. 9, the first non-metallic ring 962 provides a pre-load for the second non-metallic ring 964 to compensate for wear of the second non-metallic ring 964, which increases the useful life of the second non-metallic ring 964. This is to be contrasted to the non-metallic compression ring 838 of FIG. 8, which does not have any other mechanism to compensate for wear other than by using its inherent characteristics.

Furthermore, the first non-metallic ring 962 operates as a check valve when under pressure. For example, if system pressure makes its way from the front 966 of the second non-metallic ring 964 to the back 970 of the second non-metallic ring 964 along the top 976 of the second non-metallic ring 964, the first non-metallic ring 962 prevents such system pressure from returning to the front 966 of the second non-metallic ring 964 along the bottom 978 of the second non-metallic ring 964. Of course, if system pressure makes its way from the front 966 of the second non-metallic ring 964 to the back 970 of the second non-metallic ring 964 along the bottom 978 of the second non-metallic ring 964, the first non-metallic ring 962 prevents such system pressure from returning to the front 966 of the second non-metallic ring 964 along the top 976 of the second non-metallic ring 964.

Preferably, the first non-metallic ring 962 is a gapless (i.e., continuous) ring which is made of a rubber or rubber-like material, has spring-like qualities and can act as a check valve when under pressure. (It should be understood, however, that the first non-metallic ring does not have to have the shape of an "O" in cross-section and can take a variety of different shapes including, e.g., a "D-shape" in cross-section or a rectangular shape in cross-section, among others.) In addition, the first non-metallic ring 962 can, preferably, operate efficiently at temperatures of up to about 550 degrees Fahrenheit and, preferably, can withstand temperatures of about 600 degrees Fahrenheit. It should be understood that the above temperatures are not necessarily limiting, as other temperatures are possible. Furthermore, the first non-metallic ring 962 is preferably soft (e.g., capable of being stretched over the piston 918) and has memory (i.e., will return to its original shape when cooled or when pressure is reduced). The first non-metallic ring 962, for example, can be made of a high-temperature fluoroelastomer, such as Viton.

The second non-metallic ring 964 is, in one embodiment, a gapless (i.e., continuous) ring that can operate efficiently at temperatures of up to about 550 degrees Fahrenheit and, preferably, can withstand temperatures of about 600 degrees Fahrenheit. It should be understood that the above temperatures are not necessarily limiting, as other temperatures are possible. In addition, the second non-metallic ring 964, preferably, has a relatively low coefficient of friction. Furthermore, in one embodiment, the second non-metallic ring 964 should be capable of being stretched when heated (e.g., when it is being stretched over piston 918 for installation) but should also have memory, so that when it is cooled it returns to its original shape.

Preferably, the second non-metallic ring 964 is made of a fluoroplastic or fluoropolymer material. For example, the second non-metallic ring may be a rubber-like plastic material such as, or similar to, the materials in the fluoroplastic and fluoropolymer families that include products such as Poly Tetra Fluoro Ethylene (PTFE), Teflon (a DuPont product) and Rulon (a St. Gobain product).

Instead of providing one non-metallic ring assembly 960, a plurality of non-metallic ring assemblies 960 may be provided, e.g., in a corresponding plurality of ring grooves 928. Furthermore, instead of being gapless rings, it should be understood that one or both of the first and second non-metallic rings 962, 964 may include a gap or may include a split.

As alluded to above, in order to install the (gapless) second non-metallic ring 964, it may be heated, so that it can be stretched over the piston 918. In one example, if the second non-metallic ring 964 is made of Rulon, it may be heated to about 200 degrees Fahrenheit. (Of course, if the second non-metallic ring 964 was made of another material, it may require heating to a different temperature.) Then, it is stretched over the piston 918 (e.g., by hand) and into its ring groove 928. The second non-metallic ring 964 is placed in front (i.e., closer to the cylinder wall 912) of the first non-metallic ring 962, which will already have been placed in the ring groove 928. Alternatively, the (gapless) first non-metallic ring 962 and the (gapless) second non-metallic ring 964 can be stretched over the piston and installed into the ring groove 928 together. The second non-metallic ring 964 is allowed to cool, so that it can return to its normal size and shape. A standard ring cylinder (not shown) is used to compress the second non-metallic ring 964, so that the piston 918 can be installed in its cylinder.

As another alternative, a generally frustoconically-shaped jig (not shown) can be used to install one or both of the first and second non-metallic rings 962, 964 into the ring groove 928, if they are gapless. One or both of the first and second non-metallic rings 962, 964 are heated. Then, the first and second non-metallic rings 962, 964 are stretched, using the jig, to an adequate size and are slid over the piston 918 into the ring groove 928. The second non-metallic ring 964 is allowed to cool, so that it can return to its normal size and shape. A standard ring cylinder is used to compress the second non-metallic ring 964, so that the piston 918 can be installed in its cylinder.

Figure 10B:
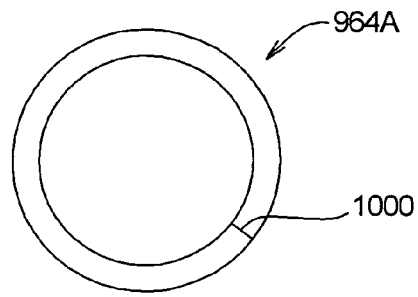
FIG. 10B is a diagrammatic representation of a top view of a second non-metallic ring showing a split in the second non-metallic ring.
Figure 10C:
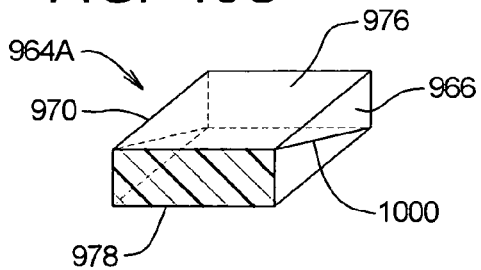
FIG. 10C is an enlarged, three dimensional, diagrammatic representation of a portion of a second non-metallic ring having a split.

In another embodiment, one or both of the first and second non-metallic rings 962, 964 may include a split. FIG. 10B is a diagrammatic representation of a top view of a second non-metallic ring 964A that includes a split 1000. FIG. 10C is an enlarged, three-dimensional, diagrammatic representation of a portion a second non-metallic ring 964A that includes a split 1000. Using a second non-metallic ring 964A that has a split 1000 makes the second non-metallic ring 964A more sensitive to pressure being applied by the first non-metallic ring 962 (relative to a gapless, second non-metallic ring 964). Thus, the split second non-metallic ring 964A is more capable of remaining in contact with the cylinder wall 912, especially if it needs to follow any irregularities in the cylinder wall 912 (due to, e.g., changes in shape of the cylinder wall 912 or scoring in the cylinder wall 912). In addition, including a split 1000 in the second non-metallic ring 964A can make installation of the second non-metallic ring 964A easier.

As shown in FIG. 10C, in one embodiment, the split 1000 extends from the top 976 to the bottom 978 of the second non-metallic ring 964A (or visa-versa) at an angle that is different from 90 degrees relative to the top 976 of the second non-metallic ring 964A. When installed inside the ring groove 928, the snug fit of the second non-metallic ring 964A effectively seals the split 1000.

In one embodiment, the angle of the split 1000 is about 22 degrees relative to the top 976 of the second non-metallic ring 964A. In another embodiment, the angle of the split 1000 is about 45 degrees relative to the top 976 of the second non-metallic ring 964A. Of course, other angles are possible and anticipated.

The split 1000 may be made, for example, using a computer-controlled cutting tool. Alternatively, the second non-metallic ring 964A may be manufactured with a split 1000.

In one embodiment, one or more gapless non-metallic rings, like second non-metallic ring 964, can be placed adjacent to a split second non-metallic ring 964A in the same ring groove 928. Using such a configuration can reduce the amount of system pressure experienced by the split 1000. One or more first non-metallic rings 962 may be provided to bias the continuous and split second non-metallic rings 964, 964A. In one embodiment, a first non-metallic ring 962 may not be provided.

In one embodiment, one split second non-metallic ring 964A is located in a first ring groove that is proximate the head (e.g., head 214) and another split second non-metallic ring 964A is located in a second ring groove distal the head. In such case, a gapless second non-metallic ring 964 is placed in the first ring groove in a position closer to the head relative to the split second non-metallic ring 964A in such ring groove. Another gapless second non-metallic ring 964 can be placed in the second ring groove in a position farther from the head relative to other split second non-metallic ring 964.

In one embodiment, two split second non-metallic rings 964A are placed in the same ring groove with their splits 1000 offset from one another. In one embodiment, the splits 1000 are offset 180 degrees from one another.

Figure 11:
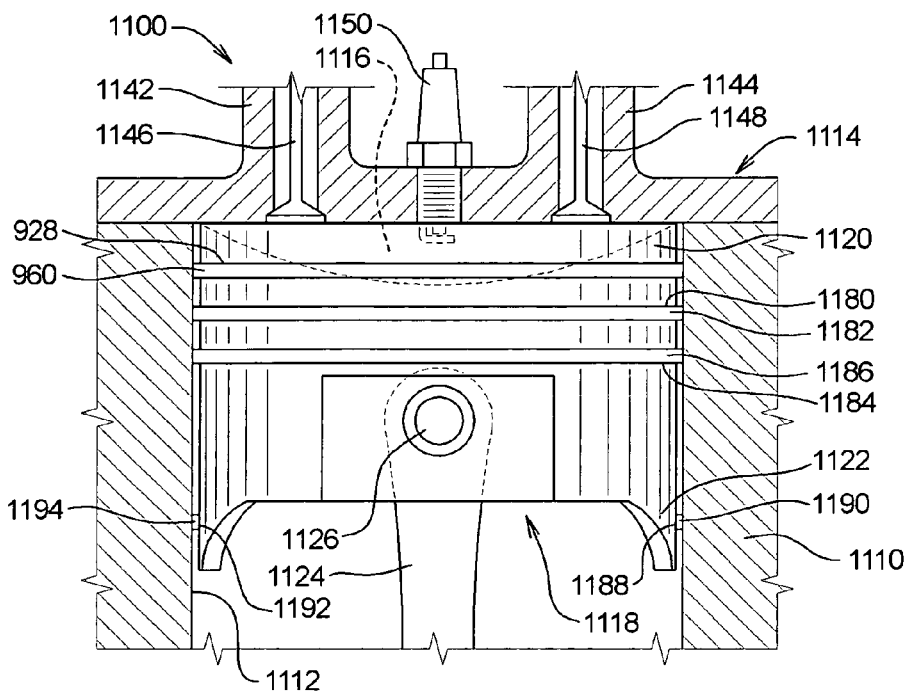
FIG. 11 is a simplified and enlarged cross-sectional view of a portion of an internal combustion engine in accordance with an embodiment of the present invention.

FIG. 11 is used to describe some other embodiments of the present invention. FIG. 11 is a simplified and enlarged cross-sectional view of a portion of an internal combustion engine 1100 illustrating an engine block 1110, a cylinder 1112, a head assembly 1114, a combustion chamber 1116, a piston 1118 (including a head portion 1120 and a skirt 1122), a rod 1124, a wrist pin 1126, an intake manifold 1142, an exhaust manifold 1144, an intake valve 1146, an exhaust valve 1148, a spark plug 1150, a first ring groove 928, a non-metallic ring assembly 960, a second ring groove 1180, a non-metallic guide ring 1182, a third ring groove 1184, an oil ring 1186, a first guide-button recess 1188, a first non-metallic guide button 1190, a second guide-button recess 1192 and a second non-metallic guide button 1194.

Figure 2:
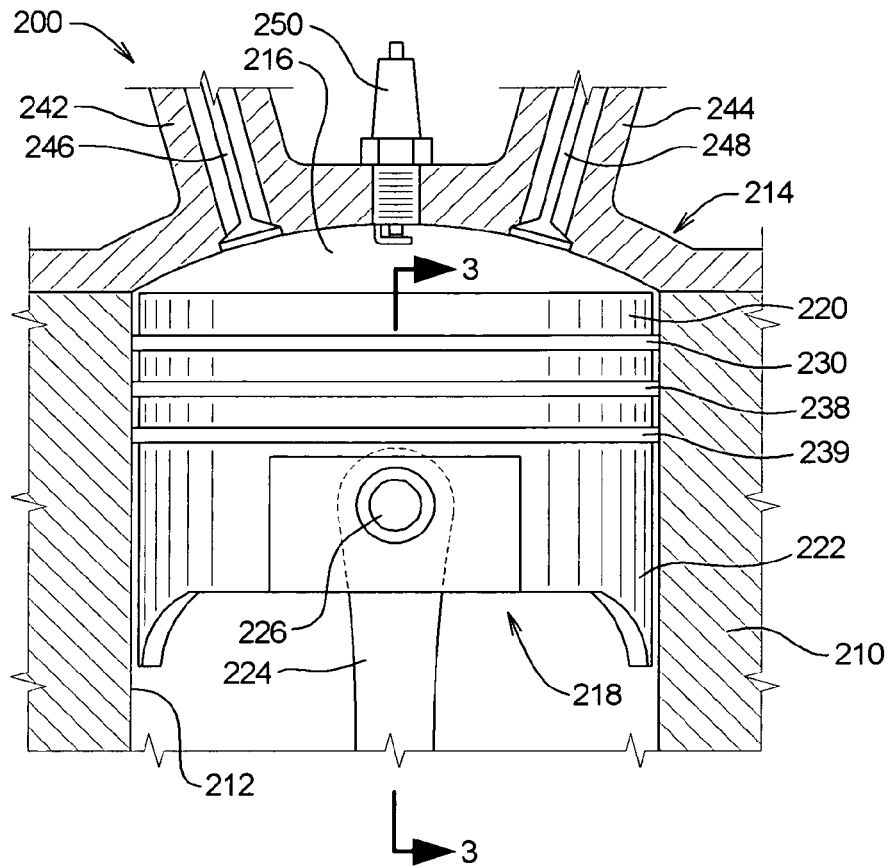
FIG. 2 is a simplified and enlarged cross-sectional view of a portion of a conventional internal combustion engine.

In contrast to the conventional internal combustion engine shown in FIG. 2, the internal combustion engine 1100 of FIG. 11 does not include first and second metallic compression rings 230, 238. Furthermore, unlike the internal combustion engines described in connection with FIGS. 7 and 8, no metallic compression rings are used in the internal combustion engine 1100 of FIG. 11.

Instead, the engine 1100 includes a non-metallic ring assembly 960, a non-metallic guide ring 1182, a first non-metallic guide button 1190 and second non-metallic guide button 1194. The latter three of which are primarily used to guide the piston 1118 as reciprocates in the cylinder 1112, thereby reducing (and, preferably, eliminating) most significant metal-to-metal contact between the piston 1118 and the cylinder 1112.

The non-metallic guide ring 1182, first non-metallic guide button 1190 and second non-metallic guide button 1194 are preferably made of a hard plastic material, such as from the fluoroplastic and fluoropolymer families that include products such as Meldin (a St. Gobain product) or Vespel (a DuPont product). Meldin and Vespel are pure poly plastics that can be modified to operate in special environments, such as steam.

It should be understood that the number and position of both the non-metallic guide rings and the non-metallic guide buttons are not restricted to the embodiment shown in FIG. 11. More or less than one non-metallic guide ring may be provided. Also, more or less than two non-metallic guide buttons may be provided. Furthermore, one or more non-metallic guide buttons may be used in place of a guide ring (or even guide rings). In addition, the position of the non-metallic guide rings and/or non-metallic guide buttons relative to the non-metallic ring assembly 960 may also be varied. For example, the non-metallic ring assembly 960 may be located at a position between two non-metallic guide rings. In one embodiment, if no piston skirt 1122 is provided, (one or both of) the first and second non-metallic guide buttons 1190, 1194 (and their corresponding recesses 1188, 1192) may be eliminated or relocated.

Figure 12:
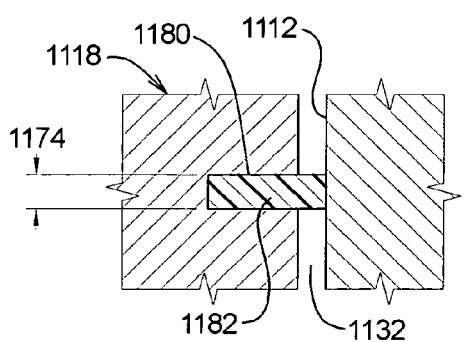
FIG. 12 is an enlarged and exaggerated diagrammatic representation, in cross-section, of a non-metallic guide ring, a portion of a piston and a portion of a cylinder in accordance with an embodiment of the present invention.

FIG. 12 is an enlarged and exaggerated diagrammatic representation of a portion of a cylinder wall 1112, a portion of a piston 1118, a gap 1132 between the cylinder wall 1112 and the piston 1118, a second ring groove 1180 (see FIG. 11) and a non-metallic guide ring 1182. The piston 1118 is designed to reciprocate within a cylinder formed by cylinder wall 1112.

Figure 13A:
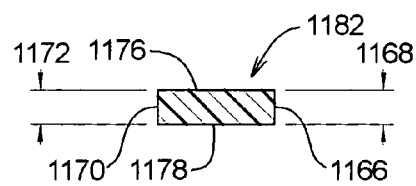
FIG. 13A is an enlarged diagrammatic representation of a cross-section of a non-metallic guide ring.

FIG. 13 is an enlarged diagrammatic representation of a cross-section of the non-metallic guide ring 1182. As shown in FIG. 13, the non-metallic guide ring 1182 has a front 1166 having a height 1168 and has a back 1170 having a height 1172. Furthermore, as shown in FIG. 12, the second ring groove 1180 has a height 1174 that is designed to snugly receive the non-metallic guide ring 1182.

It should be understood that the second ring groove 1180 does not necessarily have to have a substantially constant height 1174. In one embodiment, if the ring groove 1180 did not have a substantially constant height, the non-metallic guide ring 1182 would have at least one height which would cause at least a portion of the non-metallic guide ring 1182 to be snugly received by the second ring groove 1180.

It should be understood that the height 1168 of the front 1166 of the non-metallic guide ring 1182 does not have to be substantially equal to the height 1172 of the back 1170 of the non-metallic guide ring 1182. In one embodiment, the height 1172 of the back 1170 of the non-metallic guide ring 1182 is greater than the height 1168 of the front 1166 of the non-metallic guide ring 1182. In another embodiment, the height 1172 of the back 1170 of the non-metallic guide ring 1182 is less than the height 1168 of the front 1166 of the non-metallic guide ring 1182.

The non-metallic guide ring 1182 can, preferably, operate efficiently at temperatures of up to about 550 degrees Fahrenheit and, preferably, can withstand temperatures of about 600 degrees Fahrenheit. It should be understood that the above temperatures are not necessarily limiting, as other temperatures are possible. In addition, the non-metallic guide ring 1182, preferably, has a relatively low coefficient of friction.

Figure 13B:
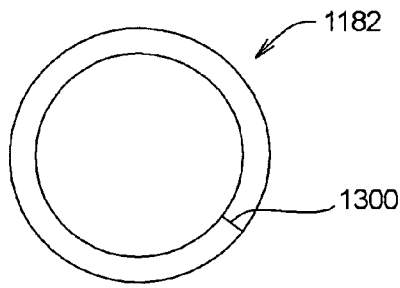
FIG. 13B is a diagrammatic representation of a top view of a non-metallic guide ring showing a split in the non-metallic guide ring.
Figure 13C:
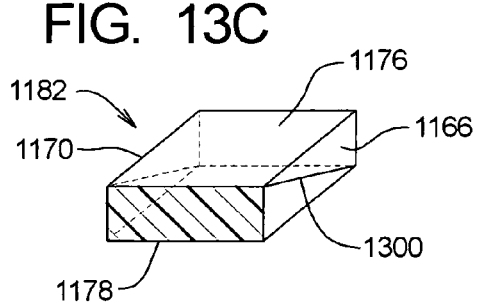
FIG. 13C is an enlarged, three dimensional, diagrammatic representation of a portion of a non-metallic guide ring having a split.

Because the non-metallic guide ring 1182 is made of a hard plastic material, it includes a split 1300 (see FIGS. 13B and 13C) to allow for easier installation. FIG. 13B is a diagrammatic representation of a top view of a non-metallic guide ring 1182 which shows split 1300. FIG. 13C is an enlarged, three-dimensional, diagrammatic representation of a portion of a non-metallic guide ring 1182 that includes a split 1300.

As shown in FIG. 13C, in one embodiment, the split 1300 extends from the top 1176 to the bottom 1178 of the non-metallic guide ring 1182 at an angle that is different from 90 degrees relative to the top 1176 of the non-metallic guide ring 1182. When installed inside the ring groove 1180, the snug fit of the non-metallic guide ring 1182 substantially seals the split 1300.

In one embodiment, the angle of the split 1300 is about 22 degrees relative to the top 1176 of the non-metallic guide ring 1182. In another embodiment, the angle of the split 1300 is about 45 degrees relative to the top 976 of the non-metallic guide ring 1182. Of course, other angles are possible and anticipated.

The split 1300 may be made, for example, using a computer-controlled cutting tool. Alternatively, the non-metallic guide ring 1182 may be manufactured with a split 1300.

Figure 14:
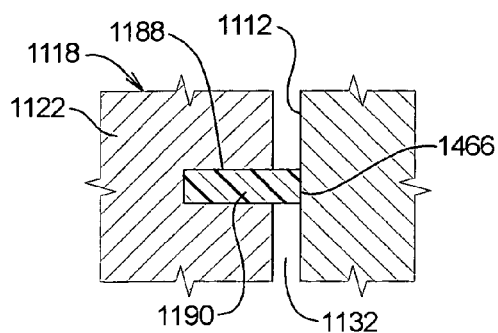
FIG. 14 is an enlarged and exaggerated diagrammatic representation, in cross-section, of a non-metallic guide button, a portion of a cylinder wall and a portion of a piston in accordance with an embodiment of the present invention.

FIG. 14 is an enlarged and exaggerated diagrammatic representation of a portion of a cylinder wall 1112, a portion of a piston 1118 (e.g., a piston skirt 1122 like that shown in FIG. 11), a gap 1132 between the cylinder wall 1112 and the piston 1118, a first guide-button recess 1188 (see also FIG. 11) and a first non-metallic guide button 1190. The first non-metallic guide button 1190 can have various shapes and the use of the term button is not intended to limit those shapes to circular shapes, although circular shapes are possible and anticipated. Rather, the term button is used for the purpose of indicating that the first non-metallic guide button 1190 does not extend around substantially the entirety of the circumference of the piston 1118. For example, in one embodiment, the first non-metallic guide button 1190 can take the shape of a segment of a ring. In another embodiment, the first non-metallic guide button 1190 can have a front 1466 that is generally circular or oval.

The size and shape of the first guide-button recess 1188 will depend on the size and shape of the first non-metallic guide button 1190. Preferably, the first non-metallic guide button 1190 is designed to be snugly received by the first guide-button recess 1188.

The first non-metallic guide button 1190 can, preferably, operate efficiently at temperatures of up to about 550 degrees Fahrenheit and, preferably, can withstand temperatures of about 600 degrees Fahrenheit. It should be understood that the above temperatures are not necessarily limiting, as other temperatures are possible. In addition, the first non-metallic guide button 1190, preferably, has a relatively low coefficient of friction.

The discussion above, with respect to the first non-metallic guide button 1190 is equally-applicable to the second non-metallic guide button 1194. Accordingly, such discussion will not be repeated below.

Figure 3:
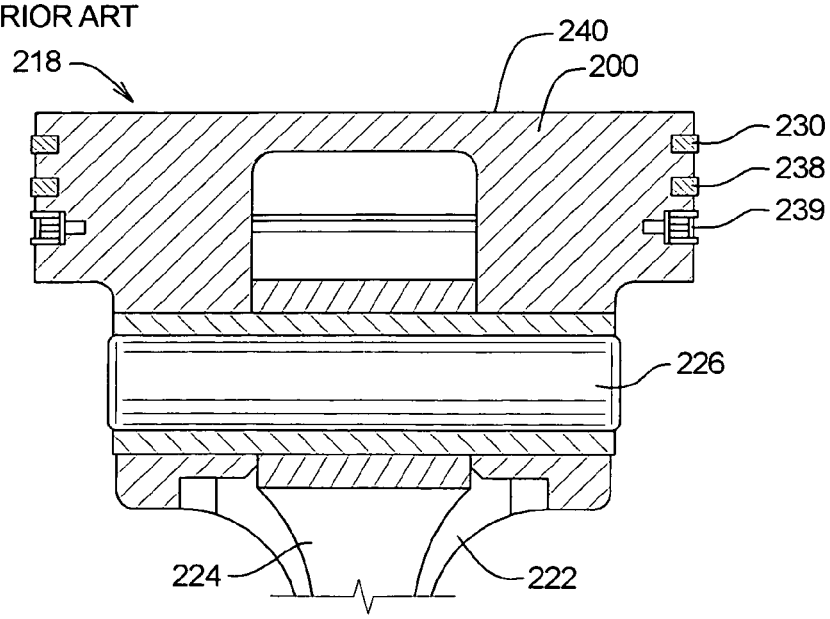
FIG. 3 is a cross-sectional view taken along line 3-3 of FIG. 2.
Figure 4:
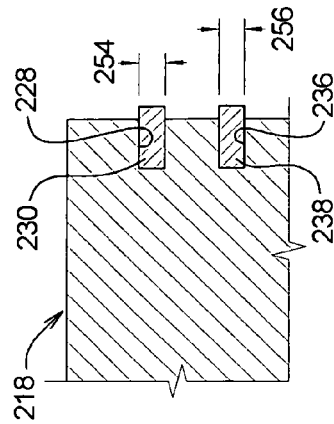
FIG. 4 is a magnified view of a portion of FIG. 3.
Figure 6:
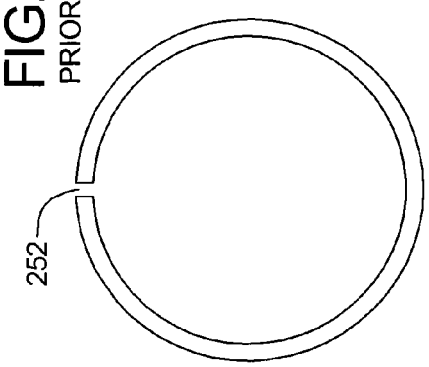
FIG. 6 is an enlarged diagrammatic representation of a metallic compression ring having a gap.
Figure 5:
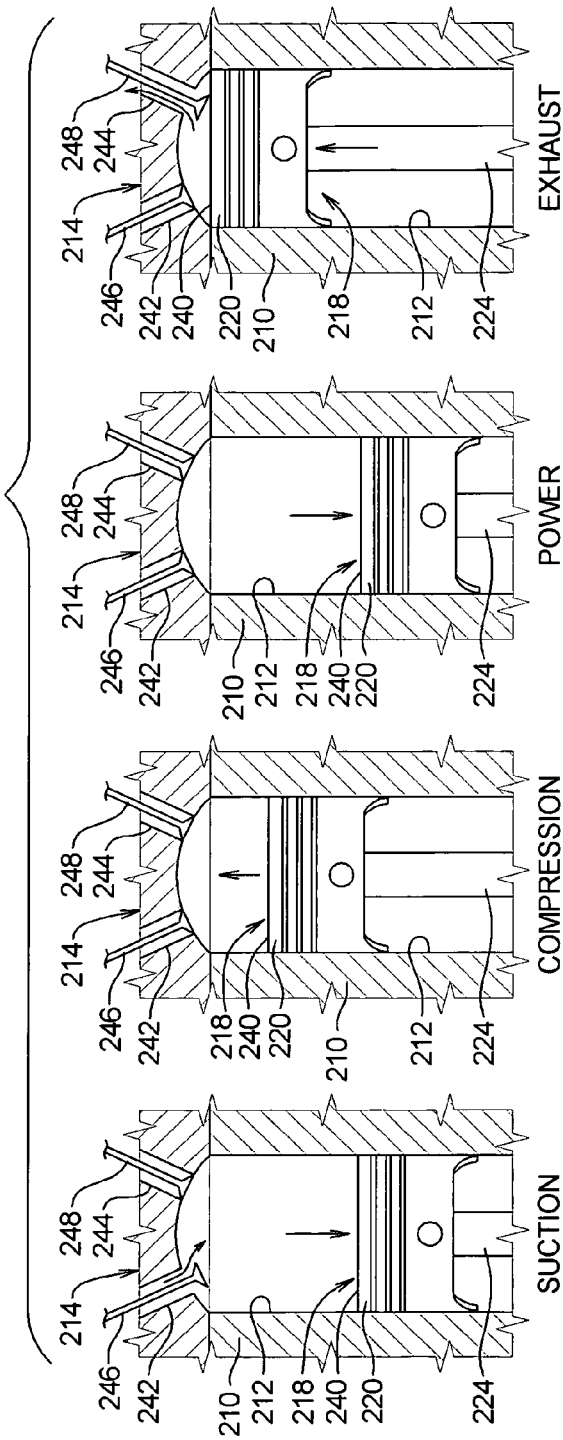
FIG. 5 is a diagrammatic representation of piston positions inside a cylinder of a conventional four-stroke engine and associated valve positions.

Returning to FIG. 11, the oil ring 1186 is a conventional metal oil ring, like the oil ring 239 shown in FIGS. 2 and 3. However, to further reduce metal-to-metal contact, at least the portion of the oil ring 1186 that contacts the cylinder wall 1112 may be made of a hard plastic material, such as from the fluoroplastic and fluoropolymer families that include products such as Meldin (a St. Gobain product) or Vespel (a DuPont product). In another embodiment, substantially the entire oil ring 1186 may be made of a hard plastic material, such as from the fluoroplastic and fluoropolymer families that include products such as Meldin (a St. Gobain product) or Vespel (a DuPont product).

In one embodiment, the internal combustion engine 1100 does not require oil to lubricate its cylinder walls 1112. Accordingly, in such embodiment, the oil ring 1186 is removed altogether.

By itself, the non-metallic guide ring 1182 cannot stop blow-by through the gap 1132 between the piston 1118 and the cylinder wall 1112 (although, in some cases, it can help to reduce it) because the non-metallic guide ring 1182 is made of a hard plastic, which is not completely capable of following changes in shape of the piston 1118 and/or the cylinder 1112. In contrast, the non-metallic ring assembly 960 (see FIG. 9) is made of one or more soft plastics that are capable of following such changes in shape. Accordingly, the non-metallic guide ring 1182, along with the first and second non-metallic guide buttons 1190, 1194, are designed to reduce (and, more preferably, prevent) contact of the piston 1118 with the cylinder wall 1112.

Because oil is not necessary to lubricate the cylinder walls 1112 due to the guide rings and/or guide buttons, certain problems associated with the non-metallic ring assembly 738 (described in the background of the invention section of the present application in connection with FIG. 7) can be overcome (or, at least, reduced). Accordingly, in one embodiment, when no oil (or even a reduced amount of oil) is used to lubricate the cylinder walls 1112, a non-metallic ring assembly 1560 (see FIG. 15) having dynamic sealing capabilities may be used.

Figure 15:
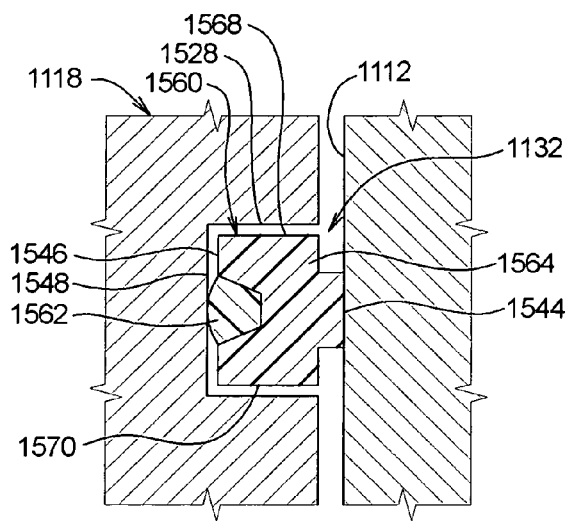
FIG. 15 is an enlarged and exaggerated diagrammatic representation of a non-metallic ring assembly, a portion of a cylinder wall and a portion of a piston in accordance with an embodiment of the present invention.

FIG. 15 is an enlarged and exaggerated diagrammatic representation of a portion of a cylinder wall 1112, a portion of a piston 1118, a gap 1132 between the cylinder wall 1112 and the piston 1118, a ring groove 1528 and a non-metallic ring assembly 1560. The non-metallic ring assembly 1560 includes a first non-metallic ring 1562 and a second non-metallic ring 1564.

Preferably, the first non-metallic ring 1562 is a gapless (i.e., continuous) ring which is made of a rubber or rubber-like material, has spring-like qualities and can act as a check valve when under pressure. (It should be understood, however, that the first non-metallic ring does not have to have the shape of an "O" in cross-section and can take a variety of different shapes.) In addition, the first non-metallic ring 1562 can, preferably, operate efficiently at temperatures of up to about 550 degrees Fahrenheit and, preferably, can withstand temperatures of about 600 degrees Fahrenheit. It should be understood that the above temperatures are not necessarily limiting, as other temperatures are possible. Furthermore, the first non-metallic ring 1562 is preferably soft (e.g., capable of being stretched over the piston 1118) and has memory (i.e., will return to its original shape when cooled or when pressure is reduced). The first non-metallic ring 1562, for example, can be made of a high-temperature fluoroelastomer, such as Viton.

The second non-metallic ring 1564 is, preferably, a gapless (i.e., continuous) ring that can operate efficiently at temperatures of up to about 550 degrees Fahrenheit and, preferably, can withstand temperatures of about 600 degrees Fahrenheit. It should be understood that the above temperatures are not necessarily limiting, as other temperatures are possible. In addition, the second non-metallic ring 1564, preferably, has a relatively low coefficient of friction. Furthermore, the second non-metallic ring 1564 should be capable of being stretched when heated (e.g., when it is being stretched over piston 1118 for installation) but should also have memory, so that when it is cooled it returns to its original shape.

Preferably, the second non-metallic ring 1564 is made of a fluoroplastic or fluoropolymer material. For example, the second non-metallic ring may be a rubber-like plastic material such as, or similar to, the materials in the fluoroplastic and fluoropolymer families that include products such as Poly Tetra Fluoro Ethylene (PTFE), Teflon (a DuPont product) and Rulon (a St. Gobain product).

The non-metallic ring assembly 1564 can be used in conjunction with, or in place of, the non-metallic ring assembly 960 described in connection with FIG. 9. In addition, instead of providing one non-metallic ring assembly 1564, a plurality of non-metallic ring assemblies 1564 may be provided in a corresponding plurality of ring grooves 1528. Furthermore, instead of being continuous rings, it should be understood that one or both of the first and second non-metallic rings 1562, 1564 may be non-continuous (e.g., split).

The non-metallic ring assembly 1560 can be installed using techniques like those described in connection with the non-metallic ring assembly 960.

With respect to the operation of the non-metallic ring assembly 1560, reference is made to FIG. 15. In one embodiment, the second non-metallic ring 1562 is generally T-shaped in cross-section (although other shapes are possible and are anticipated) and has a front 1544, which contacts the cylinder wall 1112 as the bearing area, and a back 1546 which is that surface furthest from the cylinder wall 1112. The height of the back 1546 of the second non-metallic ring 1564 is approximately twice the height of the front 1544 of the second non-metallic ring 1564 (although other differences in height are possible and anticipated).

The first non-metallic ring 1562 operates as a spring against the second non-metallic ring 1564 and pre-loads the second non-metallic ring 1564 against the cylinder wall 1112. The first non-metallic ring 1562 sits in the area between the back 1546 of the second non-metallic ring 1546 and the back 1548 of the ring groove 1528. When heated and under pressure, the first non-metallic ring 1562 acts hydrostatically.

A system pressure (either positive or negative, depending on the stroke of the engine) is created in the gap 1132 between the cylinder wall 1112 and the piston 1118. The bearing pressure associated with the pre-load is sufficient to direct the system pressure between the back 1546 of the second non-metallic ring 1564 and the back 1548 of the ring groove 1528, taking the path of least resistance.

The first non-metallic ring 1562, acting hydrostatically, moves to the top 1568 or bottom 1570 of the second non-metallic ring 1564 (depending on whether the system pressure is positive or negative) and operates as a check valve to prevent the system pressure from flowing thereby. Thus, the first non-metallic ring 1564 prevents any blow-by behind the non-metallic ring assembly 1560 through the ring groove 1528.

The moments of force associated with the system pressure are directed (perpendicularly) from the back 1546 of the second non-metallic ring 1564 toward the front 1544 of the second non-metallic ring 1564. Since the back 1546 of the second non-metallic ring 1546 is approximately twice the height of the front 1544 of the second non-metallic ring 1564, the force against the cylinder wall 1112 is amplified and is approximately twice the force of the system pressure, which prevents any blow-by between the second non-metallic ring 1564 and the cylinder wall 1112. In view of the above, it can be seen that the non-metallic ring assembly 1560 prevents blow-by.

The force in the bearing area is dependent upon the system pressure, since the system pressure is directed behind the second non-metallic ring 1564. Accordingly, the force in the bearing area will change depending upon the system pressure. Thus, the greater the system pressure, the higher the bearing pressure (and visa-versa). Therefore, the non-metallic ring assembly 1560 forms a dynamic seal.

It should be understood that the back 1546 of the second non-metallic ring 1546 is not limited to being approximately twice the height of the front 1544 of the second non-metallic ring 1564. Other relationships between such heights are possible and anticipated.

Returning to FIG. 11, it should be understood that, in some embodiments, the non-metallic ring assembly 960 and the non-metallic guide ring 1182 do not have to be in different ring grooves.

Figure 16A:
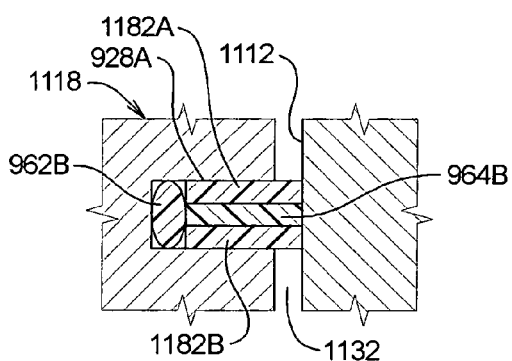
FIG. 16A is an enlarged and exaggerated diagrammatic representation, in cross-section, of a portion of a piston, a portion of a cylinder, and a pair of non-metallic guide rings and a non-metallic ring assembly in the same ring groove in accordance with an embodiment of the present invention.

For example, FIG. 16A illustrates a ring groove 928A that receives a first non-metallic ring 962B, a second non-metallic ring 964B, a first non-metallic guide ring 1182A and a second non-metallic guide ring 1182B. As shown in FIG. 16A, the second non-metallic ring 964B is interposed between first non-metallic guide ring 1182A and second non-metallic guide ring 1182B. Furthermore, the first non-metallic ring 962B biases the first non-metallic guide ring 1182A, the second non-metallic guide ring 1182B and the second non-metallic ring 964B towards the cylinder wall 1112.

Figure 16B:
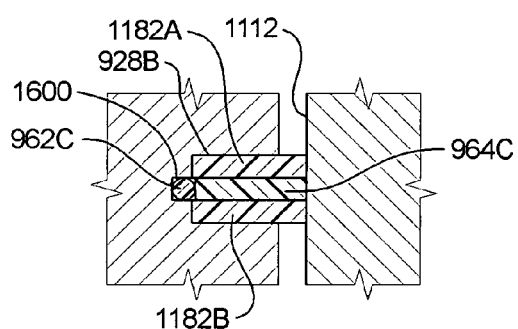
FIG. 16B is an enlarged and exaggerated diagrammatic representation, in cross-section, of a portion of a piston, a portion of a cylinder, and a pair of non-metallic guide rings and a non-metallic ring assembly in a channeled ring groove in accordance with an embodiment of the present invention.

FIG. 16B illustrates a ring groove 928B that receives a first non-metallic ring 962C, a second non-metallic ring 964C, a first non-metallic guide ring 1182A and a second non-metallic guide ring 1182B. As shown in FIG. 16B, the second non-metallic ring 964C is interposed between first non-metallic guide ring 1182A and second non-metallic guide ring 1182B. The ring groove 928B includes a channel 1600 which receives at least a portion of first non-metallic ring 962C. Accordingly, in contrast to FIG. 16A, the first non-metallic ring 962C only biases the second non-metallic ring 964C (not first and second non-metallic guide rings 1182A, 1182B) towards the cylinder wall 1112.

Figure 17:
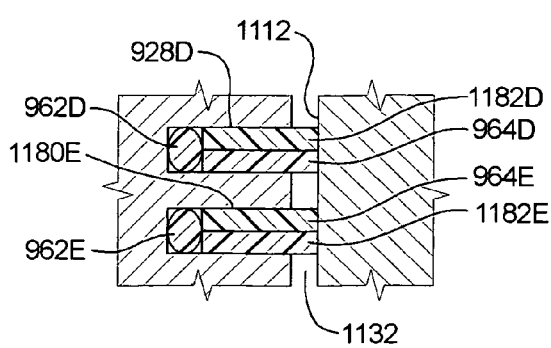
FIG. 17 is an enlarged and exaggerated diagrammatic representation, in cross-section, of a portion of a piston, a portion of a cylinder, a first non-metallic guide ring and a first non-metallic ring assembly in a first ring groove, and a second non-metallic guide ring and a second non-metallic ring assembly in a second ring groove in accordance with an embodiment of the present invention; and, FIG. 18 is a diagrammatic representation of a cross-section of a cylinder wall that is coated with a non-metallic coating in accordance with one embodiment of the present invention.

FIG. 17 illustrates a first ring groove 928D that receives first non-metallic ring 962D, first non-metallic guide ring 1182D and second non-metallic ring 964D. FIG. 17 also illustrates a second ring groove 1180E that receives first non-metallic ring 962E, second non-metallic guide ring 1182E and second non-metallic ring 964E. The first non-metallic ring 962D biases the first non-metallic guide ring 1182D and the second non-metallic ring 964D towards cylinder wall 1112. Similarly, the first non-metallic ring 962E biases the second non-metallic guide ring 1182E and second non-metallic ring 964E towards cylinder wall 1112.

As will be appreciated, the composition of and various features associated with first non-metallic rings 962B, 962C, 962D and 962E correspond with first non-metallic ring 962 (e.g., may be made of a fluoroelastomer (such as Viton), may be continuous, and may have a variety of shapes in cross-section—O-shaped, D-shaped or rectangular, among others). Similarly, the composition of and various features associated with second non-metallic rings 964A, 964B, 964C, 964D and 964E correspond with second non-metallic ring 964 (e.g., may be made of a soft plastic and may be continuous or split). In addition, the composition of and various features associated with (first and second) non-metallic guide rings 1182A, 1182B, 1182D and 1182E correspond with non-metallic guide ring 1182 (e.g., may be made of a hard plastic material and may be continuous or split).

It should be understood that more than one first non-metallic ring 962 can be provided in a single ring groove with one or more second non-metallic rings 964 and/or one or more non-metallic guide rings 1182. Furthermore, it should be understood that, in some ring grooves, a first non-metallic ring 962 may not be provided, even though such ring grooves include one or more second non-metallic rings 964 and/or one or more non-metallic guide rings 1182. In addition, it should be understood that when one or more first non-metallic rings 962 are provided, the amount of preload exerted on one non-metallic ring (e.g., second non-metallic ring 964) may be different than the amount of preload exerted on another non-metallic ring (e.g., non-metallic guide ring 1182).

In addition, it should be understood that none, one or more of the second non-metallic rings 964 may include a split and/or none, one or more of the non-metallic guide rings 1182 may include a split. It should also be understood that, in embodiments where two or more non-metallic rings (e.g., one second non-metallic ring 964 and one non-metallic guide ring 1182) include a split and are in the same (or different) ring groove, the splits may be offset from one another. In one embodiment, if N non-metallic rings in the same ring groove include a split, the splits are offset 360°/N from one another.

It should be understood that there are many other ring combinations other than those shown in the embodiments of FIGS. 16A, 16B and 17. Thus, such embodiments should only be considered as representative embodiments.

In conventional engines, the cylinder walls (like cylinder wall 212 in FIG. 2) include cross-hatching (not shown), which is used to file down the first metallic compression ring 230 and the second metallic compression ring 238 to compensate for the out-of-roundness of the cylinder 212. In contrast to conventional engines, in one embodiment, the cylinder walls (see, e.g., cylinder wall 1112 in FIG. 11) have a smooth, mirror-like finish (not shown). Among other things, this reduces friction between the cylinder wall 1112 and the non-metallic ring(s) that contact the cylinder wall 1112. Furthermore, this reduces wear of the non-metallic ring(s) that contact the cylinder wall 1112. In the case of implementing one or more features of the present invention into an existing engine (i.e., retrofitting), the mirror finish may be obtained by boring, reaming and/or honing the cylinder.

Figure 18:
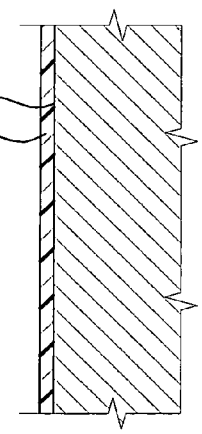

FIG. 18 is a diagrammatic representation of a cross-section of a cylinder wall 1112 that is coated with a non-metallic coating 1894 to reduce friction. The non-metallic coating 1894 on the cylinder wall 1112 may be a rubber-like plastic material such as, or similar to, the materials in the fluoroplastic and fluoropolymer families that include products such as PTFE, Teflon or Rulon. In one embodiment, the non-metallic coating 1894 extends along those portions of the cylinder wall 1112 that are likely to come into contact with the non-metallic ring assembly 960 (or non-metallic ring assembly 1560), the first non-metallic guide ring 1182, the second non-metallic guide ring 1186, the first non-metallic guide button 1190 and/or the second non-metallic guide button 1194 (see FIG. 11). Use of the non-metallic coating 1894 will further ensure that metal-to-metal contact between the piston 1118 and the cylinder wall 1112 will be reduced (and, in some embodiments, be eliminated).

In one embodiment, the non-metallic coating 1894 is baked onto the cylinder wall 1112. In one embodiment, the thickness of the non-metallic coating 1984 is about 0.001 inch. In one embodiment, the thickness of the non-metallic coating 1894 is less than 0.001 inch. In one embodiment, the cylinder wall 1112 is made of titanium or one or more titanium alloys.

It should be understood that some of the soft and hard plastic materials described above can be enhanced with various fillers such as graphite, fiberglass, Teflon and many other substances to operate with unique qualities with respect to temperature, rigidity, compression, friction, elasticity, memory and use in special environments such as steam.

With reference again to FIG. 11, the internal combustion engine 1100 includes a combustion chamber 1116 that is formed in the piston 1118 (more specifically, in the head portion 1120 of the piston 1118). Furthermore, the head assembly 1114 is flat (i.e., not curved along its inside). This is to be contrasted to the combustion chamber 216 (shown in FIG. 2) that is formed in the curved head assembly 214 (i.e., curved along its inside).

As shown in FIG. 11, the head portion 1120 of the piston 1118 is dish-shaped (i.e., has a continuous, smooth curve). It should be understood, however, that the head portion 1120 of the piston 1118 can take many different shapes. For example, in one embodiment, the head portion 1120 of the piston 1118 can be generally frustoconically shaped. In another embodiment, the head portion 1120 of the piston 1118 can be frustoconically shaped with a flat portion at its bottom. Explained generically, in all of such embodiments, the head portion 1120 of the piston 1118 is recessed.

Using a recessed head portion 1120 of the piston 1118 increases engine efficiency and provides advantages with respect to using non-metallic rings. For example, the recessed head portion 1120 of the piston 1118 directs (e.g., by refraction) the moments of force to the center of the bottom of the recessed head portion 1120, which keeps the heat in the center of the cylinder, thereby reducing the potential for heat loss. When the moments of force are directed to, and along the axis of, the center of the piston 1118, the transfer of energy to the piston 1118 (and, thus, to the connecting rod 1124) is improved. When the heat does not come into contact with the cool cylinder walls 1112, it is able to complete combustion in a shorter period of time allowing less time for heat loss. Further, heat that does radiate towards the perimeter does not reach the cylinder walls 1112; rather, it hits the walls of the recessed piston head 1120. Even further, because the combustion is taking place in the center of the recessed piston 1118, radiated heat is directed away from the cylinder walls 1112 and the rings (e.g., non-metallic ring assembly 960 and non-metallic guide ring 1182), thereby protecting the non-metallic rings. The bowl-shape of the piston head 1120 causes gases, once they reach the bottom of the piston head 1120, to collide and form a spout in the center of the piston head 1120, which results in more proper atomization, homogenization, gasification and vaporization. As such, the combustion process takes place more efficiently and in less time. Accordingly, heat loss is reduced. Finally, the increased surface area (due to the recessed shape of the piston head 1120) allows the molecules to be spread out, which improves the combustion process and allows it to occur in less time.

In some embodiments, a pressurized radiator having coolant with an operating temperature above 180 degrees Fahrenheit may be provided. In one embodiment, the operating temperature of the coolant is at least 200 degrees Fahrenheit. In one embodiment, the operating temperature of the coolant is at least 225 degrees Fahrenheit. In one embodiment, the operating temperature of the coolant is at least 250 degrees Fahrenheit. In one embodiment, the operating temperature of the coolant is above 300 degrees Fahrenheit. In one embodiment, the operating temperature of the coolant is above 350 degrees Fahrenheit. In one embodiment, the operating temperature of the coolant is about 400 degrees Fahrenheit.

Accordingly, to the extent that some of the heat rises above the top of the recessed piston head 1120 and comes into contact with the cylinder walls 1112, the cylinder walls 1112 will have a substantially higher temperature than prior engines, due to the pressurized radiator. Therefore, heat loss will be further diminished.

As shown in FIG. 11, the flat head assembly 1114 includes an intake valve 1146 that moves in a direction that is substantially parallel to the direction of movement of the piston 1118. Similarly, the flat head assembly 1114 includes an exhaust valve 1148 that moves in a direction that is substantially parallel to the direction of the movement of the piston 1118.

Using a flat head assembly 1114 provides several advantages. For example, in conventional engines (see, e.g., FIG. 2), when a required torque is applied to seal the head gasket (not shown) between the head assembly 214 and the cylinders 212 of the engine block 210, such torque tends to cause the cylinders 212 to go slightly out-of-round. This problem is exacerbated when the engine is heated, causing the cylinders 212 to even go more out-of-round.

By using a flat head assembly 1114 (see FIG. 11), the effects of torque used to seal the head gasket (not shown) between the head assembly 1114 and the engine block 1110 can be less per square inch, without sacrificing the sealability. Thus, the out-of-roundness of the cylinders is substantially reduced, which also reduces the amount of out-of-roundness that occurs when the engine is heated.

By substantially eliminating blow-by and by decreasing friction using one or more combinations of the non-metallic rings described above, a plethora of changes can be made to existing engine designs. One major design change that can be made is that engines no longer have to be made "in-square." A brief explanation is provided below.

Vehicle engine designers have faced a number of obstacles in attempting to increase power, while both limiting the amount of pollution and achieving required fuel economy. For example, power could be increased by increasing the piston stroke length inside the cylinder, by increasing the diameter of the piston, or by increasing the revolutions per minute of the engine. However, each of these design changes, in traditional engines, causes increased blow-by, increased friction and increased temperature, resulting in increased pollution and decreased fuel economy. Furthermore, it is a generally well-accepted principle in engine design that between the parameters of increasing power, decreasing pollution and increasing fuel economy, not more than two of three parameters may experience a gain, and at least one of the parameters must experience a loss.

In order to ensure that both the amount of pollution is not increased beyond acceptable levels and the fuel economy is not decreased beyond required levels, vehicle engine designers have "learned" that engines cannot be built "out-of-square." That is, the stroke length of a piston cannot be greater than approximately 70% of the diameter of the piston. Accordingly, in order to increase power, some vehicle engine designers have reduced the diameter of the pistons, reduced the stroke length, increased the number of cylinders and increased the revolutions per minute of the engine.

Because embodiments of the present invention substantially eliminate blow-by and reduce friction, certain constraints placed on vehicle engine designers can now be lifted. For example, in contrast to prior teachings, engines can be built that increase power, decrease pollution and increase fuel economy. Furthermore, such engines can either be built "in square" or "out-of-square." In addition, in order to not overload an existing engine, one or more embodiments of the present invention can be used to modify the existing engine such that power is maintained, while pollution is decreased and fuel economy is increased.

In one embodiment, the diameter of the piston 1118 is significantly increased as compared to prior pistons (like piston 218). By using a larger diameter piston 1118, additional engine design changes can be made, since there is more room to add and/or move components. In one embodiment, a larger diameter piston 1118 is used in combination with a flat head assembly 1114. It should be understood that some benefits may also be achieved by using a larger diameter piston with a conventional head assembly.

In one embodiment, the flat head assembly 1114 includes one or more oxygen injectors. Instead, or in addition, the flat head assembly may also include one or more combination oxygen/fuel injectors. In one embodiment, one or more spark plugs are provided, wherein, for example, one spark plug fires one spark and another spark plug fires multiple sparks. In one embodiment, the flat head assembly 1114 includes a fuel injector, which delivers fuel to an upper portion of the head portion 1120 of the piston 1118 (e.g., near the top of the combustion chamber 1116).

In one embodiment, the piston 1118 (more specifically, the top of the head 1120 of the piston 1118) may be coated with a catalyst for oxygen, such as platinum, rhodium or palladium (or combination thereof). It should be understood that other catalysts for oxygen may be used and, furthermore, more than one catalyst for oxygen may be used.

In one embodiment, one or more parts of the engine that are exposed to the combustion process are coated with one or more catalysts for oxygen. For example, a portion of the head assembly 1114, the bottom of intake valve 1146, the bottom of exhaust valve 1148, and/or one or more spark plugs 1150 are coated with one or more catalysts for oxygen. It should be understood that such parts may be coated with one or more catalysts for oxygen in addition to, or in place of, the head 1120 of the piston 1118.

The inventor has observed that, when a catalyst for oxygen (e.g., platinum) is used inside the combustion chamber, as opposed to externally as in a conventional engine, the heat energy can be converted to mechanical energy for useful work. Also, in some embodiments, a large portion of the remaining heat energy inside the combustion chamber can be converted into kinetic energy by way of one or more steam strokes.

In one embodiment, due to the decreased friction obtained by using the non-metallic rings, a more efficient flywheel may be used, which allows the engine to idle at significantly lower revolutions per minute. Specifically, flywheel has a weight or mass at its perimeter that is increased relative to the rest of the flywheel. For example, a metallic flywheel made primarily of a relatively lighter-weight metal can include a relatively heavier-weight metal at its perimeter. In one embodiment, the diameter of the flywheel may also be increased, as compared to a conventional flywheel, which increases the delivered torque.

In one embodiment, the flywheel has a shaft that is made out of titanium (or one or more titanium alloys), and the bearing associated with the flywheel can be modified to further reduce friction and to further decrease the revolutions per minute. More specifically, in one embodiment, the bearing is made of (or may be coated with) a hard plastic material (i.e., a non-metallic material), such as from the fluoroplastic and fluoropolymer families the include products such as Meldin (a St. Gobain product) or Vespel (a DuPont product). In another embodiment, the bearing is made of (or may be coated with) a soft plastic material (i.e., a non-metallic material), such as from the fluoroplastic and fluoropolymer materials that include products such as Poly Tetra Fluoro Ethylene (PTFE), Teflon (a DuPont product) and Rulon (a St. Gobain product). Because the engine is able to idle at lower revolutions per minute, fuel economy is increased, pollution is decreased, noise is decreased and engine wear is decreased. The flywheel is, thus, made a more effective component to store mechanical energy.

In one embodiment, the idling speed can be less than 500 rpm. In one embodiment, the idling speed can be less than 200 rpm. In one embodiment, the idling speed can be less than 100 rpm. In yet a further embodiment, the idling speed can be about 60 rpm.

Some may observe that operating an engine at lower revolutions per minute makes use of a catalytic converter impractical. However, like the inventor's prior engine described in connection with FIG. 7, embodiments of the present invention are believed to be able to meet emissions requirements without a catalytic converter or air blower. Furthermore, in embodiments of the present invention, the PCV valve may also be eliminated.

By increasing the surface area of the top of the piston 1118 (e.g., by recessing the piston and/or by increasing its diameter), the time it takes for the piston 1118 to complete a power stroke may be increased, while still maintaining the same amount power. By increasing the time to complete a power stroke, fuel and oxygen may be delivered at precise times associated with the travel of the piston 1118, which can increase efficiency, as will be understood after the following description.

As the crankshaft (not shown) turns, the piston 1118 is traveling at different speeds. Timely combustion of fuel based upon piston location 1118 allows the piston to do more useful work based upon the principle of leverage, whereby the crank is used as a lever arm. In an engine having its top dead center at 12 o'clock (0 degrees), the potential for the maximum torque that may be exerted on the crankshaft is when crank is at 3 o'clock (90 degrees), which is at a point about mid-way along the travel of the piston during its power stroke.

In one example engine, when the piston is at top dead center, the piston is not moving. A 5 degree turn of the crankshaft results in a 0.003 inch movement of the piston, as measured by a dial indicator. The next 5 degree turn of the crankshaft results in a 0.015 inch movement of the piston. Shortly, thereafter, when the crankshaft is at around 3 o'clock, a 5 degree turn of the crankshaft results in a 0.250 inch movement of the piston, which is about 83 times longer than it was traveling at the first 5 degree turn of the crankshaft (therefore, 83 times faster). Unfortunately, in a conventional engine, by the time the piston has reached its fast-moving location, a significant amount of the fuel has already been consumed. The Environmental Protection Agency (EPA) has also recognized some of these engineering facts and, in March 2005, published grant applications for not-for-profit organizations to take advantage of such facts.

According to Newton's Law of Motion, kinetic energy is equal to the force times the velocity squared, all divided by two. The inventor has recognized that about 80 percent of the work done by the piston is performed during about 40 percent of the piston's travel (which the inventor has termed the power-efficiency sweet spot). In order for combustion to take place at the right location along the stroke of the piston (i.e., when the crank is at about 3 o'clock), the amount of time required to complete the power stroke should be made longer, while still maintaining the same amount of power. Furthermore, combustion should take place faster and be more complete.

In one embodiment, the surface area of the top of the piston 1118 is increased by increasing the diameter of the piston. In one embodiment, the surface area of the top of the piston 1118 is increased by making the piston oval-shaped. In one embodiment, the surface area of the piston 1118 is increased by recessing the piston 1118 (or recessing the piston 1118 further). It should be understood that the surface area of the top of the piston can be increased by combining two or more of the above.

In one embodiment, a flame front is created by introducing a small amount of fuel, in order to get the piston past its blind spot. Oxygen is injected (e.g., at the speed of sound), via an oxygen injector, directly perpendicular to the center (or centroid, if the piston is oval-shaped) of the top of the piston 1118. At about the same time, fuel (e.g., preheated, homogenized and atomized fuel) is injected via a 360 degree spray, using one or more fuel injectors, just inside the uppermost region of the recessed piston 1118. The fuel spray is forced, via refraction, down the wall of the recessed piston head 1120 meeting the oxygen being refracted up the wall of the recessed piston head 1120. Since atomization is a function of the relative velocity squared, this violent explosive condition will be met by the flame front coming down from above to create a tornadic action for complete and rapid combustion, which is a major goal of engine efficiency. Preferably, combustion takes place during the power-efficiency sweet spot.

In one embodiment, ambient air is presented to a sieve, which separates at least a portion of the nitrogen contained in the air from at least a portion of the oxygen in the air. Thus, in one embodiment, instead of injecting pure oxygen toward the top of piston 1118, a mixture of oxygen and nitrogen (wherein the mixture has less nitrogen content than ambient air) is directed toward the top of the piston 1118.

In one embodiment, oxygen can be obtained via electrolysis through a sieve carried in the vehicle. In one embodiment, the water obtained from the by-product of combusting fuel can be delivered to a sieve, which takes oxygen from the water. In one embodiment, water is carried on-board and the water is delivered to the sieve.

In one embodiment, a sieve can be powered by electric power from the battery associated with the engine. In embodiment, a sieve can be powered by a steam jenny using the waste heat from the engine.

In one embodiment, oxygen is carried on-board in an oxygen tank. However, the inventor recognizes that storage of oxygen in a tank may be dangerous. Accordingly, using a sieve is considered to be a better alternative.

In one embodiment, some parts of the engine may be made out of titanium or one or more titanium alloys. These parts may include the engine block 1110, the cylinder walls 1112, the pistons 1118, the head assembly 1114, the intake and exhaust valves 1146, 1148 (with hollow valve stems), the cams (if present), the connecting rods 1124, the wrist pin 1126, the crankshaft, the drive shaft, gears, the fuel injectors, the oxygen injectors, among other possible parts. Using titanium allows for many advantages, including being lighter-weight, which saves energy when lifting against gravity and when turning. Another advantage of titanium is that shafts and rods will not bend, especially when made hollow, during the power stroke. Also, since less cylinders and connecting rods can be used (e.g., when increasing the surface area of the top of the piston), the length of the crankshaft can be reduced, thereby preventing bending further.

Since titanium will not easily bend, non-metallic bearings may be used. For example, in one embodiment, one or more non-metallic bearings can be made of or coated with, a rubber-like plastic material such as, or similar to, the materials in the fluoroplastic and fluoropolymer families that include products such as Poly Tetra Fluoro Ethylene (PTFE), Teflon (a DuPont product) and Rulon (a St. Gobain Product). In one embodiment, one or more non-metallic bearings can be made of a hard plastic material, such as from the fluoroplastic and fluoropolymer families that include products such as Meldin (a St. Gobain Product) or Vespel (a DuPont product). In one embodiment, one or more non-metallic bearings are used as oil pump bearings and as the main bearing. In addition, non-metallic bearing materials may be used to decrease friction associated with the wrist pin, cam, lifters, valves—both intake and exhaust, timing gear and assembly, flywheel shaft and distributor shaft, among other components.

A major advantage of using a titanium piston 1118 and titanium cylinder is that the tolerance between the cylinder wall 1112 and the piston 1118 can be reduced. This is possible because of the reduced amount of expansion of the piston 1118 when made of titanium, especially when the piston 1118 is thin. The cylinder, because it is made stronger, also do not go out-of-round. All of these factors can be used to reduce the gap 1132 between the cylinder wall 1112 and the piston 1118. Therefore, there is less opportunity for system pressure to get into the gap 1132. If some system pressure does get into the gap 1132, it will be reduced due to the size of the gap 1132. Thus, using a titanium piston 1118 and a titanium cylinder wall 1112 can assist in protecting the non-metallic rings.

Furthermore, because the titanium cylinder walls 1112 can be made thin, the temperature gradient is such that any heat reaching the cylinder walls 1112 can quickly be dissipated into the water jacket without harming the non-metallic rings. Furthermore, heat transferred to the non-metallic rings through the piston 1118 will also be dissipated into the water jacket without harming the non-metallic rings.

In one embodiment, titanium sleeves may be used to retrofit existing engines. Specifically, conventional cylinders can be bored-out and titanium sleeves can be inserted therein. In addition, the curved head assembly in the existing engine may be replaced with a flat head assembly made of titanium. In one embodiment, one or more titanium sleeves and at least a portion of the flat head assembly may be constructed as one piece.

One problem encountered when boring out the cylinders in prior engines is that the first and second metallic compression rings would wear through the bored-out cylinder walls and reach the water jacket, which would ruin the engine. However, by using titanium sleeves, the engine will actually have stronger walls after such sleeves inserted as compared to the original engine, which will allow the engine to last longer. Furthermore, the first and second metallic compression rings would be eliminated, as described in various embodiments above.

In one embodiment, the titanium sleeves have a smooth, mirror-like finish. In one embodiment, the titanium sleeves are coated with a non-metallic coating to reduce friction. The non-metallic coating may be a rubber-like plastic material such as, or similar to, the materials in the fluoroplastic and fluoropolymer families that include products such as PTFE, Teflon or Rulon.

Titanium can be forged, drawn or fabricated. Some of the above parts may be made using one or more of such techniques.

In one embodiment, the closing of the intake valve 1146 may be delayed during the compression stroke, thereby causing a portion of the air-fuel mixture (or oxygen-fuel mixture, etc.) that has been introduced into the combustion chamber to be pushed back into the intake manifold. This causes preheating and premixing of the air-fuel mixture before it is delivered to the next combustion chamber, which enhances the likelihood of complete combustion.

When using pure (or nearly pure) oxygen in combination with fuel, the oxygen-fuel mixture is only compressed about 2 to 1 (as compared to compressing the air-fuel mixture about 8 to 1 in a regular engine). Accordingly, the closing of the intake valve during the compression stroke may be delayed even further, which saves energy.

In one embodiment, the intake valve is not closed until the piston has traveled at least about 50% of the length of its compression stroke. In one embodiment, the intake valve is not closed until the piston has traveled at least about 55% of the length of its compression stroke. In one embodiment, the intake valve is not closed until the piston has traveled at least about 60% of the length of its compression stroke. In one embodiment, the intake valve is not closed until the piston has traveled at least about 65% of the length of its compression stroke.

Using a combination of non-metallic rings (which stop blow-by and reduce friction), as described above, along with making parts of the engine out of titanium (or titanium alloys) enable a steam-fuel hybrid engine. In one embodiment, steam is introduced into a combustion chamber (e.g., via a steam injector in the flat head) in which, on a previous stroke, fuel was burned. Because steam is a solvent, in one embodiment, the steam-fuel hybrid engine does not use oil to lubricate its cylinder walls.

It should be understood that the steam-fuel hybrid engine may also be combined with fuel-electric hybrid technologies to provide a steam-fuel-electric hybrid engine. Furthermore, such technologies may also be combined with hydrogen fuel cells and solar power. Furthermore, embodiments of the engine can be used without steam, but still be used as part of a fuel-electric hybrid engine or other hybrid technologies.

For example, because embodiments of the engine provide space and weight savings due to the reduction of certain engine components, a larger battery may be used for a fuel-electric hybrid engine. The battery can be used to store excess energy when the fuel portion of the engine is operating, so that the fuel portion of the engine may be turned-off at low speeds and the battery can provide electric power. Furthermore, energy can be stored in the battery using regenerative braking techniques that are known to those skilled in the art. In one embodiment, a direct drive connection is made between the battery and the drive shaft, such that electric power is provided without any gearing, pistons, connecting rods, etc. In one embodiment, when the battery level is low, the fuel portion of the engine is used to provide power.

In one embodiment, a "sidewinder" engine configuration is used. That is, the piston(s) reciprocate along an axis that is substantially parallel to the ground. In one embodiment, a dual-headed piston is provided, wherein each piston head is recessed and forms a combustion chamber. In such embodiment, two flat head assemblies are provided. A piston rod is connected to the piston and passes through the center (or centroid) of one of the piston heads. In addition, the piston has no skirt.

In one embodiment, the piston heads have oval-shaped tops. In one embodiment, the length of the oval-shaped tops of the piston heads is about 8 inches (about twice the diameter of a piston used in a Chevrolet 350 V-8 engine) and the width of the oval-shaped top of each of the piston heads is about 6 inches. The piston uses at least one of the combination of non-metallic rings described above to reduce (or substantially eliminate) blow-by.

In one embodiment, the sidewinder engine has parts that, as described above, are made of titanium or titanium alloys. In one embodiment, the cylinder walls are coated with a non-metallic material, which will be baked-on and less than 0.001 inch thick.

In one embodiment, one piston head is recessed more than the other piston head, due to the area taken up by a piston rod. In one embodiment, the wrist pin is located outside of the cylinder.

Engines made in accordance with embodiments of the present invention can use the following fuels: diesel fuel and/or a mixture thereof, gasoline and/or a mixture thereof, methanol and/or a mixture thereof, ethanol and/or a mixture thereof, and/or natural gas and/or a mixture thereof. It is anticipated that other fuels may also be used.

Although the present invention has been described in connection with an engine having pistons which reciprocate within their cylinders, certain features of the present invention may also be used in connection with rotary engines, including pistons designed for rotary engines.

The present invention, in various embodiments, includes components, methods, processes, systems and/or apparatuses substantially as depicted and described herein, including various embodiments, sub-combinations, and subsets thereof. Those with skill in the art will understand how to make and use the present invention after understanding the present disclosure. The present invention, and various embodiments, includes providing the devices and processes in the absence of items not depicted and/or described herein or in various embodiments hereof, including in the absence of such items as may have been used in previous devices or processes, e.g., for improving performance, achieving ease of and/or reducing cost of implementation. The present invention includes items which are novel, and terminology adapted from previous and/or analogous technologies, for convenience in describing novel items or processes, do not necessarily retain all aspects of conventional usage of such terminology.

The foregoing discussion of the invention has been presented for purposes of illustration and description. The foregoing is not intended to limit the invention to the forms or form disclosed herein. Although the description of the invention has included description of one or more embodiments and certain variations and modifications, other variations and modifications are within the scope of the invention, e.g., as may be within the skill and knowledge of those in the art, after understanding the present disclosure. It is intended to obtain rights which include alternative embodiments to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

While an effort has been made to describe some alternatives to the preferred embodiment, other alternatives will readily come to mind to those skilled in the art. Therefore, it should be understood that the invention may be embodied in other specific forms without departing from the spirit or central characteristics thereof. The present examples and embodiments, therefore, are to be considered in all respects as illustrative and not restrictive, and the invention is not intended to be limited to the details given herein.

What is claimed is:

1. A piston for use in an internal combustion engine, the piston comprising:
    a piston body having a first ring groove for receiving a first ring assembly, wherein the first ring assembly includes a first non-metallic ring and a second non-metallic ring, wherein the second non-metallic ring is split;
    the piston body having a second ring groove for receiving a second ring assembly, wherein the second ring assembly includes a third non-metallic ring and a fourth non-metallic ring;
    a piston head that is recessed to form a combustion chamber, wherein the recessed piston head opposes a flat head assembly and wherein a spark plug ignites a mixture including oxygen and fuel in the combustion chamber; and,
    a piston skirt having a first guide-button recess therein for receiving a first non-metallic guide button.

2. The piston of claim 1, wherein the piston is designed to be received by a cylinder having a cylinder wall and wherein the first non-metallic ring biases the second non-metallic ring towards the cylinder wall when the piston is received in the cylinder.

3. The piston of claim 2, wherein the third non-metallic ring biases the fourth non-metallic ring towards the cylinder wall when the piston is received in the cylinder.

4. The piston of claim 1, wherein the first non-metallic ring is continuous.

5. The piston of claim 4, wherein the fourth non-metallic ring is split.

6. The piston of claim 5, wherein the third non-metallic ring is continuous.

7. The piston of claim 1, wherein the piston head is coated with a catalyst.

8. The piston of claim 1, wherein the piston head has a top and the top is oval-shaped.

9. The piston of claim 7, wherein the piston head has a top and the top is oval-shaped.

10. The piston of claim 2, wherein the piston head is coated with a catalyst.

11. The piston of claim 10, wherein the piston head has a top and the top is oval-shaped.

12. The piston of claim 1, wherein the piston head is dish-shaped.

13. The piston of claim 2, wherein the first non-metallic guide button is used to reduce contact between the piston skirt and the cylinder wall as the piston moves inside the cylinder.

14. The piston of claim 13, wherein the first non-metallic guide button, first non-metallic ring and second non-metallic ring each have a hardness, and wherein the hardness of the first non-metallic guide button is greater than the hardness of the first non-metallic ring and the second non-metallic ring.

15. The piston of claim 14, wherein the third non-metallic ring and the fourth non-metallic ring each have a hardness, and wherein the hardness of the first non-metallic guide button is greater than the hardness of the third non-metallic ring and the fourth non-metallic ring.

\* \* \* \* \*